(12) United States Patent
Okugawa et al.

(10) Patent No.: US 8,310,754 B2
(45) Date of Patent: Nov. 13, 2012

(54) LASER EXCITATION FLUORESCENT MICROSCOPE

(75) Inventors: Hisashi Okugawa, Yokosuka (JP); Naoshi Aikawa, Fujisawa (JP); Masatoshi Sato, Machida (JP)

(73) Assignee: Nikon Corporation, Tokyo (JP)

( * ) Notice: Subject to any disclaimer, the term of this patent is extended or adjusted under 35 U.S.C. 154(b) by 245 days.

(21) Appl. No.: 12/748,031

(22) Filed: Mar. 26, 2010

(65) Prior Publication Data

US 2010/0182683 A1 Jul. 22, 2010

Related U.S. Application Data

(63) Continuation of application No. PCT/JP2008/003094, filed on Oct. 29, 2008.

(30) Foreign Application Priority Data

Oct. 31, 2007 (JP) ................................ 2007-283133
Nov. 1, 2007 (JP) ................................ 2007-284758

(51) Int. Cl.
*G02B 21/06* (2006.01)
*G01J 3/30* (2006.01)

(52) U.S. Cl. ...................................... 359/385; 356/318

(58) Field of Classification Search .................. 359/363, 359/368–380, 381–389; 356/318
See application file for complete search history.

(56) References Cited

U.S. PATENT DOCUMENTS

| 3,973,827 | A | 8/1976 | Uetake |
| 5,283,433 | A | 2/1994 | Tsien |
| 6,167,173 | A | 12/2000 | Schoeppe et al. |
| 6,310,729 | B1 * | 10/2001 | Tsukamoto .................. 359/634 |
| 6,486,458 | B1 | 11/2002 | Schoeppe et al. |
| 6,563,632 | B1 | 5/2003 | Schoeppe et al. |
| 6,631,226 | B1 | 10/2003 | Schoeppe et al. |
| 2003/0011772 | A1 | 1/2003 | Abe et al. |
| 2006/0028729 | A1 | 2/2006 | Nishiwaki et al. |
| 2007/0132994 | A1 * | 6/2007 | Kobayashi et al. ........... 356/328 |
| 2008/0062511 | A1 | 3/2008 | Wolleschensky |

FOREIGN PATENT DOCUMENTS

| DE | 2 243 385 | 2/1974 |
| DE | 197 02 753 A1 | 7/1998 |
| EP | 1 617 253 A1 | 1/2006 |
| GB | 1 307 032 | 2/1973 |
| JP | A-03-087721 | 4/1991 |
| JP | A-05-249408 | 9/1993 |
| JP | A-2004-177495 | 6/2004 |
| JP | A-2005-055745 | 3/2005 |
| JP | A-2005-140981 | 6/2005 |
| JP | A-2006-125970 | 5/2006 |
| JP | A-2006-133499 | 5/2006 |
| JP | A-2006-153692 | 6/2006 |
| JP | A-2006-156392 | 6/2006 |

OTHER PUBLICATIONS

Olympus Catalog, Confocal Laser Scanning Microscope FV1000 FLUOVIEW UIS2 (Dec. 2003) (with partial translation).

(Continued)

*Primary Examiner* — Alessandro Amari
(74) *Attorney, Agent, or Firm* — Oliff & Berridge, PLC

(57) ABSTRACT

The present application has a proposition to provide a highly efficient laser excitation fluorescent microscope. Accordingly, a laser excitation fluorescent microscope of the present application includes a laser light source part radiating at least two types of excitation lights having different wavelengths; a light collecting part collecting the two types of excitation lights on a sample; a high-functional dichroic mirror, disposed between the laser light source part and the light collecting part, reflecting the two types of excitation lights to make the excitation lights incident on the light collecting part, and transmitting two types of fluorescence generated at the sample; and a detecting part detecting light transmitted through the high-functional dichroic mirror, in which an incident angle θ of the excitation lights and the fluorescence to the high-functional dichroic mirror satisfies a formula of $0° < \theta < 45°$.

14 Claims, 16 Drawing Sheets

OTHER PUBLICATIONS

International Search Report issued in International Application No. PCT/JP2008/003094 on Dec. 16, 2008.

Translation of International Preliminary Report on Patentability issued in International Application No. PCT/JP2008/003094 on Jun. 1, 2010.

Extended European Search Report issued in European Patent Application No. 08844871.7 dated Jun. 15, 2011.

Jun. 26, 2012 Office Action issued in Japanese Patent Application No. 2007-284758 (with translation).

* cited by examiner

Fig. 4

INCIDENT AT 12 DEGREES    TOTAL FILM-THICKNESS (mm) 9.42428

| Layer Number | Material | Film-Thickness (nm) | Layer Number | Material | Film-Thickness (nm) | Layer Number | Material | Film-Thickness (nm) |
|---|---|---|---|---|---|---|---|---|
| | QUARTZ | - | | | | | | |
| 1 | Nb2O5 | 13.81 | 51 | Nb2O5 | 35.2 | 101 | Nb2O5 | 38.35 |
| 2 | SiO2 | 58.8 | 52 | SiO2 | 57.34 | 102 | SiO2 | 61.07 |
| 3 | Nb2O5 | 34.72 | 53 | Nb2O5 | 36.14 | 103 | Nb2O5 | 36.37 |
| 4 | SiO2 | 50.68 | 54 | SiO2 | 60.35 | 104 | SiO2 | 57.04 |
| 5 | Nb2O5 | 32.18 | 55 | Nb2O5 | 38.03 | 105 | Nb2O5 | 34.79 |
| 6 | SiO2 | 57.61 | 56 | SiO2 | 60.11 | 106 | SiO2 | 56.05 |
| 7 | Nb2O5 | 36.45 | 57 | Nb2O5 | 35.3 | 107 | Nb2O5 | 35.25 |
| 8 | SiO2 | 56.92 | 58 | SiO2 | 55.25 | 108 | SiO2 | 59.52 |
| 9 | Nb2O5 | 34.9 | 59 | Nb2O5 | 34.81 | 109 | Nb2O5 | 38.29 |
| 10 | SiO2 | 58.27 | 60 | SiO2 | 58.41 | 110 | SiO2 | 61.84 |
| 11 | Nb2O5 | 36.13 | 61 | Nb2O5 | 36.93 | 111 | Nb2O5 | 36.54 |
| 12 | SiO2 | 56.31 | 62 | SiO2 | 60.18 | 112 | SiO2 | 55.99 |
| 13 | Nb2O5 | 34.32 | 63 | Nb2O5 | 37.4 | 113 | Nb2O5 | 34.17 |
| 14 | SiO2 | 57.94 | 64 | SiO2 | 59.81 | 114 | SiO2 | 56.8 |
| 15 | Nb2O5 | 37.31 | 65 | Nb2O5 | 35.69 | 115 | Nb2O5 | 36.16 |
| 16 | SiO2 | 59.81 | 66 | SiO2 | 55.33 | 116 | SiO2 | 59.74 |
| 17 | Nb2O5 | 35.68 | 67 | Nb2O5 | 34.28 | 117 | Nb2O5 | 37.63 |
| 18 | SiO2 | 56.95 | 68 | SiO2 | 58.2 | 118 | SiO2 | 61.12 |
| 19 | Nb2O5 | 35.68 | 69 | Nb2O5 | 37.66 | 119 | Nb2O5 | 36.81 |
| 20 | SiO2 | 57.8 | 70 | SiO2 | 61.29 | 120 | SiO2 | 56.43 |
| 21 | Nb2O5 | 35.32 | 71 | Nb2O5 | 37.12 | 121 | Nb2O5 | 33.74 |
| 22 | SiO2 | 57.72 | 72 | SiO2 | 58.42 | 122 | SiO2 | 56.2 |
| 23 | Nb2O5 | 36.99 | 73 | Nb2O5 | 35.42 | 123 | Nb2O5 | 36.71 |
| 24 | SiO2 | 60.71 | 74 | SiO2 | 56.17 | 124 | SiO2 | 61.13 |
| 25 | Nb2O5 | 36.49 | 75 | Nb2O5 | 34.56 | 125 | Nb2O5 | 37.62 |
| 26 | SiO2 | 56.53 | 76 | SiO2 | 57.66 | 126 | SiO2 | 59.67 |
| 27 | Nb2O5 | 34.72 | 77 | Nb2O5 | 37.53 | 127 | Nb2O5 | 36.19 |
| 28 | SiO2 | 57.67 | 78 | SiO2 | 62.12 | 128 | SiO2 | 57.08 |
| 29 | Nb2O5 | 36.32 | 79 | Nb2O5 | 37.59 | 129 | Nb2O5 | 34.3 |
| 30 | SiO2 | 58.8 | 80 | SiO2 | 57.76 | 130 | SiO2 | 55.85 |
| 31 | Nb2O5 | 36.64 | 81 | Nb2O5 | 34.54 | 131 | Nb2O5 | 36.33 |
| 32 | SiO2 | 59.99 | 82 | SiO2 | 56.03 | 132 | SiO2 | 61.67 |
| 33 | Nb2O5 | 36.8 | 83 | Nb2O5 | 35.33 | 133 | Nb2O5 | 38.27 |
| 34 | SiO2 | 57.26 | 84 | SiO2 | 58.39 | 134 | SiO2 | 59.52 |
| 35 | Nb2O5 | 34.34 | 85 | Nb2O5 | 37.17 | 135 | Nb2O5 | 35.24 |
| 36 | SiO2 | 56.58 | 86 | SiO2 | 61.47 | 136 | SiO2 | 56.32 |
| 37 | Nb2O5 | 36.6 | 87 | Nb2O5 | 37.77 | 137 | Nb2O5 | 35.02 |
| 38 | SiO2 | 60.47 | 88 | SiO2 | 58.32 | 138 | SiO2 | 57.14 |
| 39 | Nb2O5 | 37.08 | 89 | Nb2O5 | 34.2 | 139 | Nb2O5 | 36.1 |
| 40 | SiO2 | 58.98 | 90 | SiO2 | 55.02 | 140 | SiO2 | 60.59 |
| 41 | Nb2O5 | 36.14 | 91 | Nb2O5 | 35.52 | 141 | Nb2O5 | 38.23 |
| 42 | SiO2 | 57.58 | 92 | SiO2 | 59.85 | 142 | SiO2 | 60.37 |
| 43 | Nb2O5 | 34.8 | 93 | Nb2O5 | 37.6 | 143 | Nb2O5 | 35.21 |
| 44 | SiO2 | 56.24 | 94 | SiO2 | 60.62 | 144 | SiO2 | 55.06 |
| 45 | Nb2O5 | 36.19 | 95 | Nb2O5 | 37.06 | 145 | Nb2O5 | 34.79 |
| 46 | SiO2 | 61.03 | 96 | SiO2 | 58.35 | 146 | SiO2 | 58.63 |
| 47 | Nb2O5 | 37.92 | 97 | Nb2O5 | 34.64 | 147 | Nb2O5 | 36.9 |
| 48 | SiO2 | 59.25 | 98 | SiO2 | 54.88 | 148 | SiO2 | 59.9 |
| 49 | Nb2O5 | 35.33 | 99 | Nb2O5 | 35.11 | 149 | Nb2O5 | 37.21 |
| 50 | SiO2 | 56.53 | 100 | SiO2 | 60.19 | 150 | SiO2 | 59.98 |

Fig. 5

| LAYER NUMBER | MATERIAL | FILM-THICKNESS (nm) | LAYER NUMBER | MATERIAL | FILM-THICKNESS (nm) | LAYER NUMBER | MATERIAL | FILM-THICKNESS (nm) |
|---|---|---|---|---|---|---|---|---|
| 151 | Nb2O5 | 35.87 | 201 | Nb2O5 | 10.04 | | | |
| 152 | SiO2 | 55.47 | | air | – | | | |
| 153 | Nb2O5 | 34.19 | | | | | | |
| 154 | SiO2 | 58.35 | | | | | | |
| 155 | Nb2O5 | 37.72 | | | | | | |
| 156 | SiO2 | 61.01 | | | | | | |
| 157 | Nb2O5 | 36.6 | | | | | | |
| 158 | SiO2 | 58.07 | | | | | | |
| 159 | Nb2O5 | 35.76 | | | | | | |
| 160 | SiO2 | 57.15 | | | | | | |
| 161 | Nb2O5 | 34.64 | | | | | | |
| 162 | SiO2 | 57.21 | | | | | | |
| 163 | Nb2O5 | 37.25 | | | | | | |
| 164 | SiO2 | 61.95 | | | | | | |
| 165 | Nb2O5 | 37.21 | | | | | | |
| 166 | SiO2 | 57.03 | | | | | | |
| 167 | Nb2O5 | 34.63 | | | | | | |
| 168 | SiO2 | 57.53 | | | | | | |
| 169 | Nb2O5 | 36 | | | | | | |
| 170 | SiO2 | 57.86 | | | | | | |
| 171 | Nb2O5 | 36.17 | | | | | | |
| 172 | SiO2 | 60.58 | | | | | | |
| 173 | Nb2O5 | 37.74 | | | | | | |
| 174 | SiO2 | 58.35 | | | | | | |
| 175 | Nb2O5 | 34.05 | | | | | | |
| 176 | SiO2 | 55.85 | | | | | | |
| 177 | Nb2O5 | 36.5 | | | | | | |
| 178 | SiO2 | 60.28 | | | | | | |
| 179 | Nb2O5 | 36.29 | | | | | | |
| 180 | SiO2 | 57.94 | | | | | | |
| 181 | Nb2O5 | 36.67 | | | | | | |
| 182 | SiO2 | 59.86 | | | | | | |
| 183 | Nb2O5 | 35.18 | | | | | | |
| 184 | SiO2 | 54.47 | | | | | | |
| 185 | Nb2O5 | 35.19 | | | | | | |
| 186 | SiO2 | 61.35 | | | | | | |
| 187 | Nb2O5 | 37.88 | | | | | | |
| 188 | SiO2 | 57.23 | | | | | | |
| 189 | Nb2O5 | 34.19 | | | | | | |
| 190 | SiO2 | 58.64 | | | | | | |
| 191 | Nb2O5 | 37.16 | | | | | | |
| 192 | SiO2 | 56.09 | | | | | | |
| 193 | Nb2O5 | 32.72 | | | | | | |
| 194 | SiO2 | 58.44 | | | | | | |
| 195 | Nb2O5 | 39.52 | | | | | | |
| 196 | SiO2 | 59.43 | | | | | | |
| 197 | Nb2O5 | 29.41 | | | | | | |
| 198 | SiO2 | 50.38 | | | | | | |
| 199 | Nb2O5 | 40.94 | | | | | | |
| 200 | SiO2 | 69.9 | | | | | | |

Fig. 8

INCIDENT AT 15 DEGREES    TOTAL FILM-THICKNESS (mm) 10.27728

| LAYER NUMBER | MATERIAL | FILM-THICKNESS (nm) | LAYER NUMBER | MATERIAL | FILM-THICKNESS (nm) | LAYER NUMBER | MATERIAL | FILM-THICKNESS (nm) |
|---|---|---|---|---|---|---|---|---|
| | QUARTZ | – | | | | | | |
| 1 | Nb2O5 | 13.21 | 51 | Nb2O5 | 35.33 | 101 | Nb2O5 | 37.44 |
| 2 | SiO2 | 49.82 | 52 | SiO2 | 55.12 | 102 | SiO2 | 60.12 |
| 3 | Nb2O5 | 30.42 | 53 | Nb2O5 | 34.36 | 103 | Nb2O5 | 36.52 |
| 4 | SiO2 | 48.49 | 54 | SiO2 | 58 | 104 | SiO2 | 57.02 |
| 5 | Nb2O5 | 31.91 | 55 | Nb2O5 | 37.17 | 105 | Nb2O5 | 34.07 |
| 6 | SiO2 | 55.98 | 56 | SiO2 | 60.19 | 106 | SiO2 | 55 |
| 7 | Nb2O5 | 34.49 | 57 | Nb2O5 | 36.59 | 107 | Nb2O5 | 35.67 |
| 8 | SiO2 | 53.29 | 58 | SiO2 | 57.82 | 108 | SiO2 | 60.6 |
| 9 | Nb2O5 | 33.2 | 59 | Nb2O5 | 35.11 | 109 | Nb2O5 | 38.01 |
| 10 | SiO2 | 57.13 | 60 | SiO2 | 55.86 | 110 | SiO2 | 59.61 |
| 11 | Nb2O5 | 36.43 | 61 | Nb2O5 | 34.8 | 111 | Nb2O5 | 35.36 |
| 12 | SiO2 | 57.69 | 62 | SiO2 | 58.34 | 112 | SiO2 | 55.67 |
| 13 | Nb2O5 | 34.93 | 63 | Nb2O5 | 37.57 | 113 | Nb2O5 | 34.39 |
| 14 | SiO2 | 56.95 | 64 | SiO2 | 61.02 | 114 | SiO2 | 56.38 |
| 15 | Nb2O5 | 35.6 | 65 | Nb2O5 | 36.56 | 115 | Nb2O5 | 36.1 |
| 16 | SiO2 | 56.71 | 66 | SiO2 | 56.51 | 116 | SiO2 | 60.54 |
| 17 | Nb2O5 | 34.87 | 67 | Nb2O5 | 34.4 | 117 | Nb2O5 | 37.95 |
| 18 | SiO2 | 57.97 | 68 | SiO2 | 56.34 | 118 | SiO2 | 59.38 |
| 19 | Nb2O5 | 37.08 | 69 | Nb2O5 | 35.69 | 119 | Nb2O5 | 34.74 |
| 20 | SiO2 | 59.5 | 70 | SiO2 | 59.04 | 120 | SiO2 | 54.48 |
| 21 | Nb2O5 | 35.45 | 71 | Nb2O5 | 37.36 | 121 | Nb2O5 | 34.55 |
| 22 | SiO2 | 55.95 | 72 | SiO2 | 60.53 | 122 | SiO2 | 58.24 |
| 23 | Nb2O5 | 35.11 | 73 | Nb2O5 | 36.41 | 123 | Nb2O5 | 37.06 |
| 24 | SiO2 | 57.86 | 74 | SiO2 | 56 | 124 | SiO2 | 60.37 |
| 25 | Nb2O5 | 35.96 | 75 | Nb2O5 | 33.86 | 125 | Nb2O5 | 37.17 |
| 26 | SiO2 | 58.28 | 76 | SiO2 | 56.28 | 126 | SiO2 | 58.56 |
| 27 | Nb2O5 | 36.54 | 77 | Nb2O5 | 36.5 | 127 | Nb2O5 | 34.76 |
| 28 | SiO2 | 59.05 | 78 | SiO2 | 60.41 | 128 | SiO2 | 54.6 |
| 29 | Nb2O5 | 35.51 | 79 | Nb2O5 | 37.3 | 129 | Nb2O5 | 34.64 |
| 30 | SiO2 | 55.42 | 80 | SiO2 | 59.11 | 130 | SiO2 | 59.21 |
| 31 | Nb2O5 | 34.43 | 81 | Nb2O5 | 35.66 | 131 | Nb2O5 | 37.99 |
| 32 | SiO2 | 57.79 | 82 | SiO2 | 55.91 | 132 | SiO2 | 60.89 |
| 33 | Nb2O5 | 36.7 | 83 | Nb2O5 | 34.1 | 133 | Nb2O5 | 36.44 |
| 34 | SiO2 | 58.94 | 84 | SiO2 | 56.53 | 134 | SiO2 | 57 |
| 35 | Nb2O5 | 35.78 | 85 | Nb2O5 | 36.83 | 135 | Nb2O5 | 34.73 |
| 36 | SiO2 | 57.01 | 86 | SiO2 | 61.35 | 136 | SiO2 | 55.87 |
| 37 | Nb2O5 | 34.85 | 87 | Nb2O5 | 37.53 | 137 | Nb2O5 | 35.18 |
| 38 | SiO2 | 55.57 | 88 | SiO2 | 58.03 | 138 | SiO2 | 59.24 |
| 39 | Nb2O5 | 34.59 | 89 | Nb2O5 | 34.61 | 139 | Nb2O5 | 38.07 |
| 40 | SiO2 | 57.86 | 90 | SiO2 | 55.51 | 140 | SiO2 | 61.33 |
| 41 | Nb2O5 | 36.96 | 91 | Nb2O5 | 34.88 | 141 | Nb2O5 | 36.33 |
| 42 | SiO2 | 59.35 | 92 | SiO2 | 57.8 | 142 | SiO2 | 55.79 |
| 43 | Nb2O5 | 35.32 | 93 | Nb2O5 | 36.98 | 143 | Nb2O5 | 34.22 |
| 44 | SiO2 | 55.26 | 94 | SiO2 | 61.05 | 144 | SiO2 | 56.85 |
| 45 | Nb2O5 | 34.34 | 95 | Nb2O5 | 37.41 | 145 | Nb2O5 | 36.24 |
| 46 | SiO2 | 56.86 | 96 | SiO2 | 57.63 | 146 | SiO2 | 59.69 |
| 47 | Nb2O5 | 35.9 | 97 | Nb2O5 | 34 | 147 | Nb2O5 | 37.47 |
| 48 | SiO2 | 58.88 | 98 | SiO2 | 54.89 | 148 | SiO2 | 60.42 |
| 49 | Nb2O5 | 36.86 | 99 | Nb2O5 | 35.46 | 149 | Nb2O5 | 36.3 |
| 50 | SiO2 | 59.07 | 100 | SiO2 | 59.57 | 150 | SiO2 | 55.83 |

Fig. 9

| LAYER NUMBER | MATERIAL | FILM-THICKNESS (nm) | LAYER NUMBER | MATERIAL | FILM-THICKNESS (nm) |
|---|---|---|---|---|---|
| 151 | Nb2O5 | 33.87 | 201 | Nb2O5 | 36.59 |
| 152 | SiO2 | 56.75 | 202 | SiO2 | 60.39 |
| 153 | Nb2O5 | 36.98 | 203 | Nb2O5 | 35.87 |
| 154 | SiO2 | 60.91 | 204 | SiO2 | 54.5 |
| 155 | Nb2O5 | 37.18 | 205 | Nb2O5 | 34.52 |
| 156 | SiO2 | 58.54 | 206 | SiO2 | 60.54 |
| 157 | Nb2O5 | 35.52 | 207 | Nb2O5 | 38.11 |
| 158 | SiO2 | 56.29 | 208 | SiO2 | 57.75 |
| 159 | Nb2O5 | 34.36 | 209 | Nb2O5 | 34.17 |
| 160 | SiO2 | 56.67 | 210 | SiO2 | 58.32 |
| 161 | Nb2O5 | 36.86 | 211 | Nb2O5 | 37.5 |
| 162 | SiO2 | 61.42 | 212 | SiO2 | 56.59 |
| 163 | Nb2O5 | 37.33 | 213 | Nb2O5 | 32.32 |
| 164 | SiO2 | 57.31 | 214 | SiO2 | 57.4 |
| 165 | Nb2O5 | 34.31 | 215 | Nb2O5 | 39.67 |
| 166 | SiO2 | 56.01 | 216 | SiO2 | 60.28 |
| 167 | Nb2O5 | 35.4 | 217 | Nb2O5 | 29.42 |
| 168 | SiO2 | 57.96 | 218 | SiO2 | 49.62 |
| 169 | Nb2O5 | 36.55 | 219 | Nb2O5 | 41.07 |
| 170 | SiO2 | 60.31 | 220 | SiO2 | 69.66 |
| 171 | Nb2O5 | 37.13 | 221 | Nb2O5 | 10 |
| 172 | SiO2 | 57.37 | | air | -- |
| 173 | Nb2O5 | 33.86 | | | |
| 174 | SiO2 | 55.32 | | | |
| 175 | Nb2O5 | 36.07 | | | |
| 176 | SiO2 | 60.07 | | | |
| 177 | Nb2O5 | 36.91 | | | |
| 178 | SiO2 | 58.67 | | | |
| 179 | Nb2O5 | 36.12 | | | |
| 180 | SiO2 | 57.76 | | | |
| 181 | Nb2O5 | 34.68 | | | |
| 182 | SiO2 | 55.46 | | | |
| 183 | Nb2O5 | 35.86 | | | |
| 184 | SiO2 | 61 | | | |
| 185 | Nb2O5 | 37.81 | | | |
| 186 | SiO2 | 58.38 | | | |
| 187 | Nb2O5 | 34.87 | | | |
| 188 | SiO2 | 56.98 | | | |
| 189 | Nb2O5 | 35.84 | | | |
| 190 | SiO2 | 57.34 | | | |
| 191 | Nb2O5 | 35.52 | | | |
| 192 | SiO2 | 59.64 | | | |
| 193 | Nb2O5 | 37.98 | | | |
| 194 | SiO2 | 59.68 | | | |
| 195 | Nb2O5 | 34.64 | | | |
| 196 | SiO2 | 55.18 | | | |
| 197 | Nb2O5 | 35.89 | | | |
| 198 | SiO2 | 59.89 | | | |
| 199 | Nb2O5 | 36.34 | | | |
| 200 | SiO2 | 57.68 | | | |

Fig. 12

INCIDENT AT 25 DEGREES    TOTAL FILM-THICKNESS (mm) 13.43647

| MATERIAL | LAYER NUMBER | FILM-THICKNESS (nm) | MATERIAL | LAYER NUMBER | FILM-THICKNESS (nm) | MATERIAL | LAYER NUMBER | FILM-THICKNESS (nm) |
|---|---|---|---|---|---|---|---|---|
| QUARTZ | | — | | | | | | |
| Nb2O5 | 1 | 20.16 | Nb2O5 | 51 | 123.52 | Nb2O5 | 101 | 62.62 |
| SiO2 | 2 | 40.66 | SiO2 | 52 | 71.75 | SiO2 | 102 | 10 |
| Nb2O5 | 3 | 32.73 | Nb2O5 | 53 | 23.83 | Nb2O5 | 103 | 58.46 |
| SiO2 | 4 | 199.78 | SiO2 | 54 | 10 | SiO2 | 104 | 40.44 |
| Nb2O5 | 5 | 45.04 | Nb2O5 | 55 | 91.8 | Nb2O5 | 105 | 118.21 |
| SiO2 | 6 | 10.44 | SiO2 | 56 | 61.79 | SiO2 | 106 | 79.24 |
| Nb2O5 | 7 | 164.57 | Nb2O5 | 57 | 106.91 | Nb2O5 | 107 | 122.82 |
| SiO2 | 8 | 23.17 | SiO2 | 58 | 169.78 | SiO2 | 108 | 35.25 |
| Nb2O5 | 9 | 48.51 | Nb2O5 | 59 | 10 | Nb2O5 | 109 | 91.06 |
| SiO2 | 10 | 10 | SiO2 | 60 | 36.19 | SiO2 | 110 | 11.29 |
| Nb2O5 | 11 | 57.7 | Nb2O5 | 61 | 81.21 | Nb2O5 | 111 | 10 |
| SiO2 | 12 | 163.53 | SiO2 | 62 | 12.43 | SiO2 | 112 | 111.4 |
| Nb2O5 | 13 | 52.93 | Nb2O5 | 63 | 31.49 | Nb2O5 | 113 | 116.6 |
| SiO2 | 14 | 10 | SiO2 | 64 | 103.36 | SiO2 | 114 | 26.72 |
| Nb2O5 | 15 | 46.14 | Nb2O5 | 65 | 39.19 | Nb2O5 | 115 | 36.92 |
| SiO2 | 16 | 33.46 | SiO2 | 66 | 10 | SiO2 | 116 | 35.36 |
| Nb2O5 | 17 | 106.72 | Nb2O5 | 67 | 58.78 | Nb2O5 | 117 | 29.64 |
| SiO2 | 18 | 155.22 | SiO2 | 68 | 48.36 | SiO2 | 118 | 115.96 |
| Nb2O5 | 19 | 114.89 | Nb2O5 | 69 | 121.62 | Nb2O5 | 119 | 10.55 |
| SiO2 | 20 | 39.62 | SiO2 | 70 | 84.62 | SiO2 | 120 | 95.46 |
| Nb2O5 | 21 | 132.29 | Nb2O5 | 71 | 10 | Nb2O5 | 121 | 11.16 |
| SiO2 | 22 | 34.36 | SiO2 | 72 | 10 | SiO2 | 122 | 73.05 |
| Nb2O5 | 23 | 117.88 | Nb2O5 | 73 | 100.87 | Nb2O5 | 123 | 57.77 |
| SiO2 | 24 | 118.17 | SiO2 | 74 | 191.53 | SiO2 | 124 | 10 |
| Nb2O5 | 25 | 28.94 | Nb2O5 | 75 | 89.87 | Nb2O5 | 125 | 64.51 |
| SiO2 | 26 | 10 | SiO2 | 76 | 11.74 | SiO2 | 126 | 40.87 |
| Nb2O5 | 27 | 64.78 | Nb2O5 | 77 | 34.01 | Nb2O5 | 127 | 52.04 |
| SiO2 | 28 | 92.74 | SiO2 | 78 | 64.26 | SiO2 | 128 | 13.5 |
| Nb2O5 | 29 | 10 | Nb2O5 | 79 | 38.16 | Nb2O5 | 129 | 47.14 |
| SiO2 | 30 | 44.14 | SiO2 | 80 | 10 | SiO2 | 130 | 186.88 |
| Nb2O5 | 31 | 192.75 | Nb2O5 | 81 | 81.64 | Nb2O5 | 131 | 56.68 |
| SiO2 | 32 | 27.68 | SiO2 | 82 | 24 | SiO2 | 132 | 17.53 |
| Nb2O5 | 33 | 35.4 | Nb2O5 | 83 | 56.41 | Nb2O5 | 133 | 10.26 |
| SiO2 | 34 | 46.32 | SiO2 | 84 | 10 | SiO2 | 134 | 132.67 |
| Nb2O5 | 35 | 121.95 | Nb2O5 | 85 | 83.86 | Nb2O5 | 135 | 108.96 |
| SiO2 | 36 | 198.83 | SiO2 | 86 | 30.26 | SiO2 | 136 | 42.05 |
| Nb2O5 | 37 | 16.77 | Nb2O5 | 87 | 57.74 | Nb2O5 | 137 | 37.53 |
| SiO2 | 38 | 160.24 | SiO2 | 88 | 11.96 | SiO2 | 138 | 10 |
| Nb2O5 | 39 | 91.63 | Nb2O5 | 89 | 65.98 | Nb2O5 | 139 | 48.07 |
| SiO2 | 40 | 49.31 | SiO2 | 90 | 10 | SiO2 | 140 | 100.82 |
| Nb2O5 | 41 | 11.11 | Nb2O5 | 91 | 159.59 | Nb2O5 | 141 | 10 |
| SiO2 | 42 | 59.65 | SiO2 | 92 | 23.18 | SiO2 | 142 | 33.37 |
| Nb2O5 | 43 | 69.91 | Nb2O5 | 93 | 182.97 | Nb2O5 | 143 | 81.48 |
| SiO2 | 44 | 30.61 | SiO2 | 94 | 10 | SiO2 | 144 | 52.82 |
| Nb2O5 | 45 | 25.18 | Nb2O5 | 95 | 64.12 | Nb2O5 | 145 | 10 |
| SiO2 | 46 | 35.73 | SiO2 | 96 | 14.03 | SiO2 | 146 | 78.95 |
| Nb2O5 | 47 | 70.48 | Nb2O5 | 97 | 65.3 | Nb2O5 | 147 | 51.4 |
| SiO2 | 48 | 188.6 | SiO2 | 98 | 10 | SiO2 | 148 | 10 |
| Nb2O5 | 49 | 50.27 | Nb2O5 | 99 | 57.68 | Nb2O5 | 149 | 67.46 |
| SiO2 | 50 | 32.06 | SiO2 | 100 | 46.89 | SiO2 | 150 | 75.22 |

Fig. 13

| LAYER NUMBER | MATERIAL | FILM-THICKNESS (nm) | LAYER NUMBER | MATERIAL | FILM-THICKNESS (nm) |
|---|---|---|---|---|---|
| 151 | Nb2O5 | 10 | 201 | Nb2O5 | 20.65 |
| 152 | SiO2 | 66.75 | 202 | SiO2 | 48.89 |
| 153 | Nb2O5 | 77.01 | 203 | Nb2O5 | 72.33 |
| 154 | SiO2 | 10 | 204 | SiO2 | 10 |
| 155 | Nb2O5 | 30.23 | 205 | Nb2O5 | 41.71 |
| 156 | SiO2 | 112.72 | 206 | SiO2 | 40.83 |
| 157 | Nb2O5 | 14.66 | 207 | Nb2O5 | 66.43 |
| 158 | SiO2 | 38.45 | 208 | SiO2 | 20.79 |
| 159 | Nb2O5 | 81.73 | 209 | Nb2O5 | 44.44 |
| 160 | SiO2 | 10 | 210 | SiO2 | 47.46 |
| 161 | Nb2O5 | 35 | 211 | Nb2O5 | 61.4 |
| 162 | SiO2 | 45.69 | 212 | SiO2 | 16.58 |
| 163 | Nb2O5 | 71.47 | 213 | Nb2O5 | 49.99 |
| 164 | SiO2 | 10 | 214 | SiO2 | 57.37 |
| 165 | Nb2O5 | 44.93 | 215 | Nb2O5 | 36.76 |
| 166 | SiO2 | 51.58 | 216 | SiO2 | 50.8 |
| 167 | Nb2O5 | 45.02 | 217 | Nb2O5 | 39.64 |
| 168 | SiO2 | 10 | 218 | SiO2 | 61.12 |
| 169 | Nb2O5 | 60.6 | 219 | Nb2O5 | 29.07 |
| 170 | SiO2 | 80.13 | 220 | SiO2 | 68.58 |
| 171 | Nb2O5 | 44.63 | 221 | Nb2O5 | 32.77 |
| 172 | SiO2 | 10 | 222 | SiO2 | 59.93 |
| 173 | Nb2O5 | 60.06 | 223 | Nb2O5 | 31.17 |
| 174 | SiO2 | 57.85 | 224 | SiO2 | 67.99 |
| 175 | Nb2O5 | 28.32 | 225 | Nb2O5 | 34.66 |
| 176 | SiO2 | 11.16 | 226 | SiO2 | 42.1 |
| 177 | Nb2O5 | 80.6 | 227 | Nb2O5 | 28.66 |
| 178 | SiO2 | 76.46 | 228 | SiO2 | 66.7 |
| 179 | Nb2O5 | 24.51 | 229 | Nb2O5 | 11.21 |
| 180 | SiO2 | 26.31 | 230 | SiO2 | 40.77 |
| 181 | Nb2O5 | 58.3 | 231 | Nb2O5 | 111.15 |
| 182 | SiO2 | 10 | 232 | SiO2 | 75.45 |
| 183 | Nb2O5 | 31.99 | 233 | Nb2O5 | 20.45 |
| 184 | SiO2 | 12.62 | 234 | SiO2 | 43.4 |
| 185 | Nb2O5 | 110.48 | 235 | Nb2O5 | 41.61 |
| 186 | SiO2 | 181.57 | 236 | SiO2 | 99.09 |
| 187 | Nb2O5 | 118.15 | air | | — |
| 188 | SiO2 | 36.21 | | | |
| 189 | Nb2O5 | 142.08 | | | |
| 190 | SiO2 | 31.89 | | | |
| 191 | Nb2O5 | 50.29 | | | |
| 192 | SiO2 | 10 | | | |
| 193 | Nb2O5 | 74.77 | | | |
| 194 | SiO2 | 22.48 | | | |
| 195 | Nb2O5 | 66.73 | | | |
| 196 | SiO2 | 11.97 | | | |
| 197 | Nb2O5 | 72.53 | | | |
| 198 | SiO2 | 17.13 | | | |
| 199 | Nb2O5 | 35.34 | | | |
| 200 | SiO2 | 48.2 | | | |

Fig. 16

INCIDENT AT 45 DEGREES   TOTAL FILM-THICKNESS (mm) 19.3193

LAYER NUMBER  FILM-THICKNESS (nm)  MATERIAL   LAYER NUMBER  FILM-THICKNESS (nm)
   MATERIAL         LAYER NUMBER   FILM-THICKNESS (nm) / MATERIAL

| Layer | Material | Thickness | Layer | Material | Thickness | Layer | Material | Thickness |
|---|---|---|---|---|---|---|---|---|
|  | QUARTZ | - |  |  |  |  |  |  |
| 1 | Nb2O5 | 16.19 | 51 | Nb2O5 | 32.68 | 101 | Nb2O5 | 38.29 |
| 2 | SiO2 | 33.76 | 52 | SiO2 | 62.14 | 102 | SiO2 | 52.99 |
| 3 | Nb2O5 | 244.3 | 53 | Nb2O5 | 32.86 | 103 | Nb2O5 | 51.47 |
| 4 | SiO2 | 19.74 | 54 | SiO2 | 69.47 | 104 | SiO2 | 58.48 |
| 5 | Nb2O5 | 41.57 | 55 | Nb2O5 | 30.71 | 105 | Nb2O5 | 17.2 |
| 6 | SiO2 | 10.42 | 56 | SiO2 | 68.65 | 106 | SiO2 | 115.47 |
| 7 | Nb2O5 | 119.85 | 57 | Nb2O5 | 22.53 | 107 | Nb2O5 | 33.07 |
| 8 | SiO2 | 10 | 58 | SiO2 | 247.09 | 108 | SiO2 | 54.56 |
| 9 | Nb2O5 | 33.56 | 59 | Nb2O5 | 66.69 | 109 | Nb2O5 | 30.83 |
| 10 | SiO2 | 16.68 | 60 | SiO2 | 18.06 | 110 | SiO2 | 66.24 |
| 11 | Nb2O5 | 17.91 | 61 | Nb2O5 | 41.77 | 111 | Nb2O5 | 29.41 |
| 12 | SiO2 | 195.03 | 62 | SiO2 | 52.03 | 112 | SiO2 | 31.34 |
| 13 | Nb2O5 | 219.62 | 63 | Nb2O5 | 126.38 | 113 | Nb2O5 | 26.24 |
| 14 | SiO2 | 206.2 | 64 | SiO2 | 264.74 | 114 | SiO2 | 89.28 |
| 15 | Nb2O5 | 16.75 | 65 | Nb2O5 | 23.05 | 115 | Nb2O5 | 10.75 |
| 16 | SiO2 | 181.79 | 66 | SiO2 | 50.66 | 116 | SiO2 | 91.97 |
| 17 | Nb2O5 | 113.14 | 67 | Nb2O5 | 64.52 | 117 | Nb2O5 | 23.92 |
| 18 | SiO2 | 46.34 | 68 | SiO2 | 18.3 | 118 | SiO2 | 100.29 |
| 19 | Nb2O5 | 109.26 | 69 | Nb2O5 | 57.19 | 119 | Nb2O5 | 24.22 |
| 20 | SiO2 | 152.24 | 70 | SiO2 | 55.86 | 120 | SiO2 | 54.47 |
| 21 | Nb2O5 | 114.22 | 71 | Nb2O5 | 32.49 | 121 | Nb2O5 | 42.97 |
| 22 | SiO2 | 48.29 | 72 | SiO2 | 68.82 | 122 | SiO2 | 100.88 |
| 23 | Nb2O5 | 116.21 | 73 | Nb2O5 | 38.1 | 123 | Nb2O5 | 20.69 |
| 24 | SiO2 | 11.39 | 74 | SiO2 | 62.82 | 124 | SiO2 | 35.77 |
| 25 | Nb2O5 | 10 | 75 | Nb2O5 | 32.35 | 125 | Nb2O5 | 64.71 |
| 26 | SiO2 | 105.13 | 76 | SiO2 | 69.86 | 126 | SiO2 | 93.99 |
| 27 | Nb2O5 | 11.34 | 77 | Nb2O5 | 35.53 | 127 | Nb2O5 | 17.8 |
| 28 | SiO2 | 98.69 | 78 | SiO2 | 64.85 | 128 | SiO2 | 50.47 |
| 29 | Nb2O5 | 16.73 | 79 | Nb2O5 | 35.42 | 129 | Nb2O5 | 52.42 |
| 30 | SiO2 | 95.42 | 80 | SiO2 | 67.24 | 130 | SiO2 | 150.76 |
| 31 | Nb2O5 | 45.31 | 81 | Nb2O5 | 30.7 | 131 | Nb2O5 | 10.19 |
| 32 | SiO2 | 28.48 | 82 | SiO2 | 94.99 | 132 | SiO2 | 61.11 |
| 33 | Nb2O5 | 50.87 | 83 | Nb2O5 | 12.09 | 133 | Nb2O5 | 17.3 |
| 34 | SiO2 | 69.69 | 84 | SiO2 | 118.71 | 134 | SiO2 | 128.31 |
| 35 | Nb2O5 | 26.03 | 85 | Nb2O5 | 25.55 | 135 | Nb2O5 | 40.3 |
| 36 | SiO2 | 74.37 | 86 | SiO2 | 74.96 | 136 | SiO2 | 15.59 |
| 37 | Nb2O5 | 36.01 | 87 | Nb2O5 | 23.3 | 137 | Nb2O5 | 58.28 |
| 38 | SiO2 | 44.84 | 88 | SiO2 | 121.97 | 138 | SiO2 | 70.31 |
| 39 | Nb2O5 | 67.63 | 89 | Nb2O5 | 13.89 | 139 | Nb2O5 | 110.38 |
| 40 | SiO2 | 33.45 | 90 | SiO2 | 92.26 | 140 | SiO2 | 10.98 |
| 41 | Nb2O5 | 29.35 | 91 | Nb2O5 | 32.26 | 141 | Nb2O5 | 10.5 |
| 42 | SiO2 | 113.47 | 92 | SiO2 | 60.62 | 142 | SiO2 | 67.66 |
| 43 | Nb2O5 | 10.09 | 93 | Nb2O5 | 34.84 | 143 | Nb2O5 | 37.94 |
| 44 | SiO2 | 122.61 | 94 | SiO2 | 70.9 | 144 | SiO2 | 16.25 |
| 45 | Nb2O5 | 10.32 | 95 | Nb2O5 | 36.65 | 145 | Nb2O5 | 62.86 |
| 46 | SiO2 | 125.81 | 96 | SiO2 | 65.74 | 146 | SiO2 | 137.49 |
| 47 | Nb2O5 | 12.51 | 97 | Nb2O5 | 29.94 | 147 | Nb2O5 | 10.27 |
| 48 | SiO2 | 127.6 | 98 | SiO2 | 74.68 | 148 | SiO2 | 51.48 |
| 49 | Nb2O5 | 14.23 | 99 | Nb2O5 | 36.17 | 149 | Nb2O5 | 10.99 |
| 50 | SiO2 | 77.73 | 100 | SiO2 | 58.9 | 150 | SiO2 | 14.17 |

Fig. 17

| LAYER NUMBER | MATERIAL | FILM-THICKNESS (nm) | LAYER NUMBER | MATERIAL | FILM-THICKNESS (nm) | LAYER NUMBER | MATERIAL | FILM-THICKNESS (nm) |
|---|---|---|---|---|---|---|---|---|
| 151 | Nb2O5 | 121.81 | 201 | Nb2O5 | 147.23 | 251 | Nb2O5 | 116.49 |
| 152 | SiO2 | 98.93 | 202 | SiO2 | 209.75 | 252 | SiO2 | 38.79 |
| 153 | Nb2O5 | 12.49 | 203 | Nb2O5 | 80.7 | 253 | Nb2O5 | 145.19 |
| 154 | SiO2 | 61.58 | 204 | SiO2 | 190.64 | 254 | SiO2 | 31.23 |
| 155 | Nb2O5 | 57.13 | 205 | Nb2O5 | 28.05 | 255 | Nb2O5 | 35.86 |
| 156 | SiO2 | 220.72 | 206 | SiO2 | 203.69 | 256 | SiO2 | 118.79 |
| 157 | Nb2O5 | 36.46 | 207 | Nb2O5 | 67.67 | | air | − |
| 158 | SiO2 | 27.84 | 208 | SiO2 | 189.75 | | | |
| 159 | Nb2O5 | 77.19 | 209 | Nb2O5 | 10.24 | | | |
| 160 | SiO2 | 11.63 | 210 | SiO2 | 194.21 | | | |
| 161 | Nb2O5 | 60.57 | 211 | Nb2O5 | 104.98 | | | |
| 162 | SiO2 | 50.64 | 212 | SiO2 | 24.25 | | | |
| 163 | Nb2O5 | 49.45 | 213 | Nb2O5 | 14 | | | |
| 164 | SiO2 | 10.79 | 214 | SiO2 | 13.34 | | | |
| 165 | Nb2O5 | 54.4 | 215 | Nb2O5 | 77.82 | | | |
| 166 | SiO2 | 134.54 | 216 | SiO2 | 189.13 | | | |
| 167 | Nb2O5 | 10.62 | 217 | Nb2O5 | 87.21 | | | |
| 168 | SiO2 | 36.21 | 218 | SiO2 | 16.19 | | | |
| 169 | Nb2O5 | 64.02 | 219 | Nb2O5 | 32.83 | | | |
| 170 | SiO2 | 251.02 | 220 | SiO2 | 18.08 | | | |
| 171 | Nb2O5 | 10.14 | 221 | Nb2O5 | 163.99 | | | |
| 172 | SiO2 | 76.72 | 222 | SiO2 | 180.78 | | | |
| 173 | Nb2O5 | 119.27 | 223 | Nb2O5 | 89.13 | | | |
| 174 | SiO2 | 86.25 | 224 | SiO2 | 136.46 | | | |
| 175 | Nb2O5 | 107.34 | 225 | Nb2O5 | 107.97 | | | |
| 176 | SiO2 | 115.04 | 226 | SiO2 | 34.85 | | | |
| 177 | Nb2O5 | 23.75 | 227 | Nb2O5 | 120.6 | | | |
| 178 | SiO2 | 21.38 | 228 | SiO2 | 110.36 | | | |
| 179 | Nb2O5 | 56.2 | 229 | Nb2O5 | 18.3 | | | |
| 180 | SiO2 | 129.34 | 230 | SiO2 | 23.01 | | | |
| 181 | Nb2O5 | 108.31 | 231 | Nb2O5 | 359.29 | | | |
| 182 | SiO2 | 278.25 | 232 | SiO2 | 19.2 | | | |
| 183 | Nb2O5 | 11.96 | 233 | Nb2O5 | 515.36 | | | |
| 184 | SiO2 | 54.95 | 234 | SiO2 | 26.88 | | | |
| 185 | Nb2O5 | 56.5 | 235 | Nb2O5 | 121.28 | | | |
| 186 | SiO2 | 206.32 | 236 | SiO2 | 180.33 | | | |
| 187 | Nb2O5 | 66.02 | 237 | Nb2O5 | 107.93 | | | |
| 188 | SiO2 | 39.27 | 238 | SiO2 | 12.92 | | | |
| 189 | Nb2O5 | 10.02 | 239 | Nb2O5 | 273.49 | | | |
| 190 | SiO2 | 120.58 | 240 | SiO2 | 11.76 | | | |
| 191 | Nb2O5 | 133.81 | 241 | Nb2O5 | 238.6 | | | |
| 192 | SiO2 | 92.24 | 242 | SiO2 | 21.8 | | | |
| 193 | Nb2O5 | 10.53 | 243 | Nb2O5 | 145.93 | | | |
| 194 | SiO2 | 82.18 | 244 | SiO2 | 38.74 | | | |
| 195 | Nb2O5 | 102.94 | 245 | Nb2O5 | 112.39 | | | |
| 196 | SiO2 | 159.22 | 246 | SiO2 | 138.39 | | | |
| 197 | Nb2O5 | 121.91 | 247 | Nb2O5 | 109.31 | | | |
| 198 | SiO2 | 47.6 | 248 | SiO2 | 61.64 | | | |
| 199 | Nb2O5 | 142.26 | 249 | Nb2O5 | 104.45 | | | |
| 200 | SiO2 | 16.01 | 250 | SiO2 | 146.24 | | | |

LASER EXCITATION FLUORESCENT MICROSCOPE

CROSS REFERENCE TO RELATED APPLICATIONS

This application is a continuation application of International Application PCT/JP2008/003094, filed Oct. 29, 2008, designating the U.S., and claims the benefit of priority from Japanese Patent Application No. 2007-283133 and Japanese Patent Application No. 2007-284758, filed on Oct. 31, 2007 and Nov. 1, 2007, respectively, the entire contents of which are incorporated herein by reference.

BACKGROUND

1. Field

The present application relates to a laser excitation fluorescent microscope provided with a high-functional dichroic mirror that separates a plurality of types of excitation lights and a plurality of types of fluorescence.

2. Description of the Related Art

When a sample on which multistaining procedure is performed using a plurality of types of fluorescent dyes is observed with a confocal laser scanning fluorescence microscope, a plurality of types of laser lights having different wavelengths are used as excitation lights, and a dichroic mirror for separating the excitation lights and a plurality of types of fluorescence generated in accordance with the excitation lights is used. The dichroic mirror has a wavelength characteristic such that there are a plurality of separation wavelengths (rising points from reflecting bands to transmitting bands). In the present specification, such a dichroic mirror having a plurality of separation wavelengths is referred to as "high-functional dichroic mirror".

What is shown by a solid line in FIG. 20 is a wavelength characteristic curve of transmittance of a high-functional dichroic mirror disclosed in Non-Patent document 1: Olympus Catalog, Confocal Laser Scanning Microscope FV1000 FLUOVIEW UIS2. Normally, a glass substrate on which a dielectric multilayer is formed is used as the high-functional dichroic mirror. In order to separate a plurality of types of excitation lights and a plurality of types of fluorescence using the dielectric multilayer with high efficiency, it is only required to devise to improve a reflectivity in a reflecting band and a transmittance in a transmitting band, and to suppress a ripple of the wavelength characteristic curve at the time of designing layers of the dielectric multilayer.

However, when a characteristic of a dielectric multilayer is strongly controlled, a total film-thickness of the dielectric multilayer tends to increase. When the total film-thickness is large, a glass substrate is likely to be deformed by a stress of the multilayer, which may distort a shape of a laser spot and lower a spatial resolution of a fluorescence image.

Further, in the wavelength characteristic curve shown in FIG. 20, it is not possible to completely separate the plurality of types of excitation lights and the plurality of types of fluorescence, so that there is a possibility that, for example, a part of the fluorescence generated from the sample is wasted and a detection sensitivity of a fluorescence image is lowered.

Accordingly, the present application has a proposition to provide a highly efficient laser excitation fluorescent microscope.

SUMMARY

A laser excitation fluorescent microscope of the present embodiment is characterized in that it includes a laser light source part radiating at least two types of excitation lights having different wavelengths; a light collecting part collecting the two types of excitation lights radiated by the laser light source part on a sample; a high-functional dichroic mirror, disposed between the laser light source part and the light collecting part, reflecting the two types of excitation lights radiated by the laser light source part to make the excitation lights incident on the light collecting part, and transmitting two types of fluorescence generated at the sample in accordance with the two types of excitation lights; and a detecting part detecting light transmitted through the high-functional dichroic mirror, in which an incident angle θ of the excitation lights and the fluorescence to the high-functional dichroic mirror satisfies a formula of 0°<θ<45°.

Note that the incident angle θ of the excitation lights and the fluorescence to the high-functional dichroic mirror preferably satisfies a formula of 10°<θ<25°.

Further, the incident angle θ of the excitation lights and the fluorescence to the high-functional dichroic mirror preferably satisfies a formula of 10°<θ<15°.

Further, the incident angle θ of the excitation lights and the fluorescence to the high-functional dichroic mirror is preferably 12°.

Further, in the laser excitation fluorescent microscope of the present embodiment, a separating layer of the high-functional dichroic mirror is preferably formed by a dielectric multilayer.

Further, a laser excitation fluorescent microscope of the present embodiment is characterized in that it includes a laser light source part radiating at least two types of excitation lights having different wavelengths; a light collecting part collecting the two types of excitation lights radiated by the laser light source part on a sample; a high-functional dichroic mirror, disposed between the laser light source part and the light collecting part, reflecting the two types of excitation lights radiated by the laser light source part to make the excitation lights incident on the light collecting part, and transmitting two types of fluorescence generated at the sample in accordance with the two types of excitation lights, the high-functional dichroic mirror being formed by a dielectric multilayer; and a detecting part detecting light transmitted through the high-functional dichroic mirror, in which a wavelength characteristic curve of a reflectivity and a transmittance of the high-functional dichroic mirror has a first reflecting band covering a wavelength band of one of the two types of excitation lights, a first transmitting band covering a wavelength band of one of the fluorescence generated in accordance with said one of the two types of excitation lights, a second reflecting band covering a wavelength band of other one of the two types of excitation lights, and a second transmitting band covering a wavelength band of one of the fluorescence generated in accordance with said other one of the two types of excitation lights, in which a reflectivity in each of the first reflecting band and the second reflecting band is 95% or more, a transmittance in each of the first transmitting band and the second transmitting band is 95% or more, a wavelength width $T_1$ of the first transmitting band and a wavelength width $T_2$ of the second transmitting band are each 25 nm or more, and a rising width $A_1$ from the first reflecting band to the first transmitting band and a rising width $A_2$ from the second reflecting band to the second transmitting band are each 6 nm or less.

Note that the transmittance in each of the first transmitting band and the second transmitting band preferably indicates a value of 98% or more for a range of 90% or more of the wavelength width.

Further, a gap B between the first transmitting band and the second transmitting band is preferably 20 nm or less.

Further, an incident angle θ of the excitation lights and the fluorescence to the high-functional dichroic mirror preferably satisfies a formula of 0°<θ<45°.

Further, the incident angle θ of the excitation lights and the fluorescence to the high-functional dichroic mirror preferably satisfies a formula of 10°<θ<25°.

Further, the incident angle θ of the excitation lights and the fluorescence to the high-functional dichroic mirror preferably satisfies a formula of 10°<θ<15°.

Further, the incident angle θ of the excitation lights and the fluorescence to the high-functional dichroic mirror is preferably 12°.

Further, the detecting part may also detect a spectrum of light transmitted through the high-functional dichroic mirror.

BRIEF DESCRIPTION OF THE DRAWINGS

FIG. 4 is a view showing a structure of a high-functional dichroic mirror designed under a condition where an incident angle θ is 12°.

FIG. 5 is a continuation of FIG. 4.

FIG. 8 is a view showing a structure of a high-functional dichroic mirror designed under a condition where the incident angle θ is 15°.

FIG. 9 is a continuation of FIG. 8.

FIG. 12 is a view showing a structure of the high-functional dichroic mirror 22 designed under a condition where the incident angle θ is 25°.

FIG. 13 is continuation of FIG. 12.

FIG. 16 is a view showing a structure of the high-functional dichroic mirror 22 designed under a condition where the incident angle θ is 45° (comparative example).

FIG. 17 is continuation of FIG. 16.

DETAILED DESCRIPTION OF THE EMBODIMENT

Hereinafter, embodiments of the present invention will be described. The present embodiment is an embodiment of a confocal laser scanning fluorescence microscope system.

Figure 1:
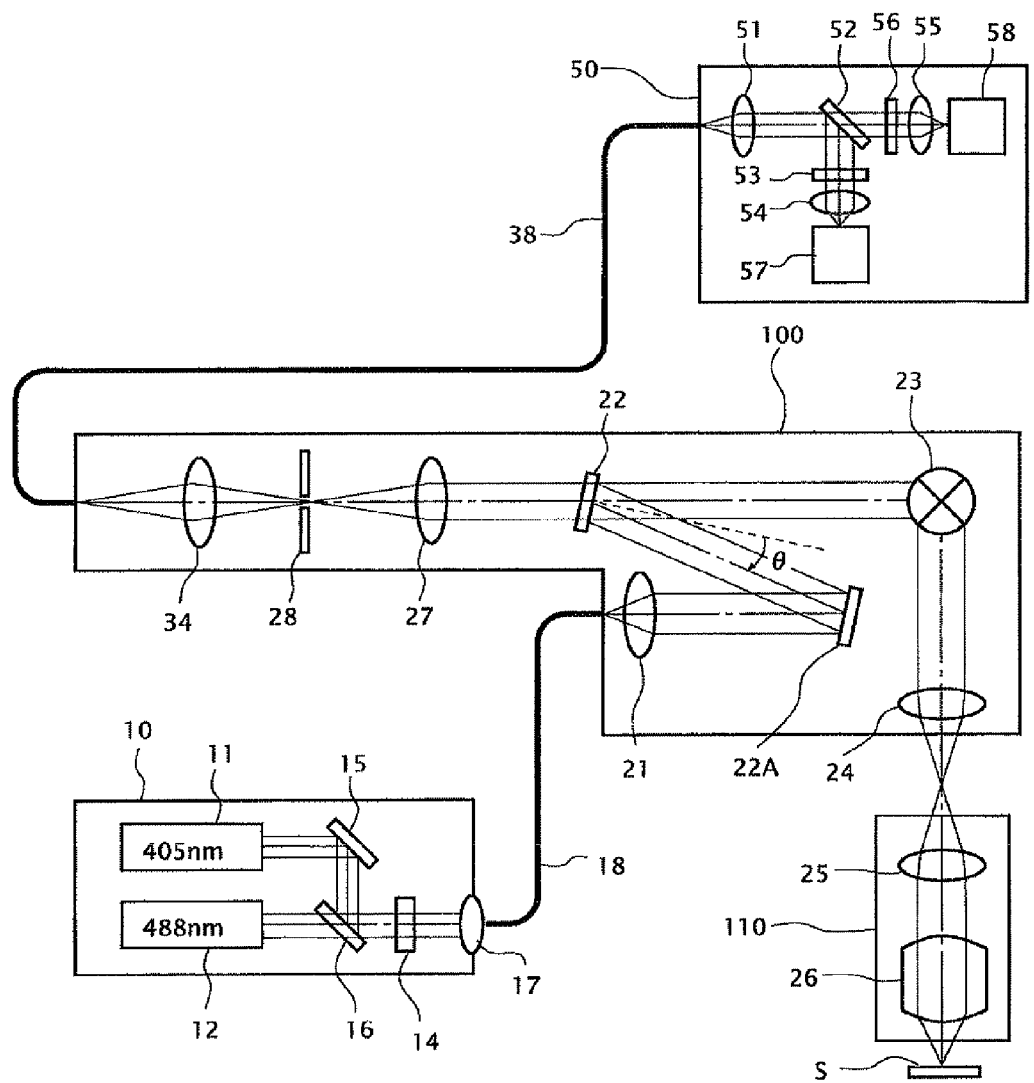
FIG. 1 is a structural diagram of a microscope system.

At first, a structure of the microscope system will be explained. FIG. 1 is a structural diagram of the microscope system. As shown in FIG. 1, the microscope system includes a laser unit 10, a confocal unit 100, a microscope body 110, a detecting unit 50, and a not-shown controlling unit. Among the above, the laser unit 10 and the confocal unit 100 are optically coupled by an optical fiber 18, and the confocal unit 100 and the detecting unit 50 are optically coupled by an optical fiber 38.

A sample S on which multistaining procedure is performed using a plurality of types of fluorescent dyes is set in the microscope body 110. Here, for simplification, the number of types of fluorescent dyes used for staining is set as two, in which a first fluorescent dye whose excitation wavelength is 405 nm and a second fluorescent dye whose excitation wavelength is 488 nm are supposed to be used. Incidentally, the first fluorescent dye has a fluorescence wavelength that corresponds to a long wavelength side of the excitation wavelength thereof (approximately in a range of 430 nm to 470 nm), and the second fluorescent dye has a fluorescence wavelength that corresponds to a long wavelength side of the excitation wavelength thereof (approximately in a range of 510 nm to 610 nm).

The laser unit 10 includes a laser light source 11 that emits laser light having the same wavelength as the excitation wavelength of the first fluorescent dye (405 nm), a laser light source 12 that emits laser light having the same wavelength as the excitation wavelength of the second fluorescent dye (488 nm), an all-reflective mirror 15, a combining mirror (dichroic mirror) 16, an AOTF (Acoustic Optical Tunable Filter) 14, and a fiber coupler 17. Incidentally, the wavelength of the laser light emitted from the laser light source 11 has a variation width of 400 nm to 415 nm in wavelength due to an individual difference, and the wavelength of the laser light emitted from the laser light source 12 also has a variation width of 486 nm to 490 nm in wavelength based on the same reason.

The confocal unit 100 includes a collimating lens 21, an all-reflective mirror 22A, a high-functional dichroic mirror 22, a light scanner (galvanometer scanner or the like) 23, a pupil projecting lens 24, a light collecting lens 27, a pinhole member 28, and a relay lens 34. Among the above, the high-functional dichroic mirror 22 is provided by forming a dielectric multilayer as a separating layer on a glass substrate.

The microscope body 110 includes a light collecting lens 25, an objective lens 26, and a not-shown stage that supports the sample S. In a state where the objective lens 26 is focused on the sample S, the sample S, an exit end of the optical fiber 18, the pinhole member 28, and an entrance end of the optical fiber 38 are optically conjugate to one another.

The detecting unit 50 includes a collimating lens 51; a dichroic mirror 52; emission filters 53, 56; light collecting lenses 54, 55; and photomultiplier tubes (PMT) 57, 58.

In the above microscope system, the laser unit 10, the confocal unit 100, the microscope body 110, and the detecting unit 50 are coupled to the not-shown controlling unit. In the controlling unit, a controlling circuit that controls respective parts, a computing circuit that executes image processing, and the like are mounted. Further, the controlling unit is coupled to an inputting device and a displaying device via a computer.

Next, an operation of the microscope system will be described.

In the laser unit 10, the laser light emitted from the laser light source 12 is transmitted through the combining mirror 16, incident on the optical fiber 18 via the AOTF 14 and the fiber coupler 17, and is directed to the confocal unit 100. Further, the laser light emitted from the laser light source 11 is reflected by the combining mirror 16 after being reflected by the all-reflective mirror 15, and is led to a light path common to the laser light emitted from the laser light source 12. Note that wavelength selection and light intensity adjustment of the laser lights directing from the laser unit 10 to the confocal unit 100 are conducted by the AOTF 14.

In the confocal unit 100, the laser lights emitted from the exit end of the optical fiber 18 are incident on the all-reflective mirror 22A after being turned into parallel pencil of light by the collimating lens 21. The laser lights incident on the all-reflective mirror 22A are reflected by the all-reflective mirror 22A and incident on the high-functional dichroic mirror 22.

A separation wavelength of the high-functional dichroic mirror 22 is set to include the long wavelength side of the excitation wavelength of the first fluorescent dye (405 nm) and the long wavelength side of the excitation wavelength of the second fluorescent dye (488 nm) (details will be described later). Accordingly, the excitation light (whose wavelength is 405 nm) included in the laser light emitted from the laser light source 11 and the excitation light (whose wavelength is 488 nm) included in the laser light emitted from the laser light source 12 are reflected by the high-functional dichroic mirror 22.

The excitation lights reflected by the high-functional dichroic mirror 22 are incident on the light scanner 23. The excitation lights incident on the light scanner 23 are sequentially reflected by two movable mirrors of the light scanner 23 and emitted from the light scanner 23. The excitation lights emitted from the light scanner 23 direct to the microscope body 110 via the pupil projecting lens 24.

The excitation lights incident on the microscope body 110 are incident on the objective lens 26 via the light collecting lens 25. The excitation lights incident on the objective lens 26 are collected by the objective lens 26 to form a laser spot on the sample S. If the light scanner 23 is driven under this state, the laser spot two-dimensionally scans over the sample S.

Fluorescence are generated on the laser spot on the sample S. The fluorescence proceed, in the opposite direction, along the light path of the excitation lights that form the laser spot, and are incident on the high-functional dichroic mirror 22 via the objective lens 26, the light collecting lens 25, the pupil projecting lens 24, and the light scanner 23. An incident angle of the fluorescence with respect to the high-functional dichroic mirror 22 is the same as an incident angle of the laser lights reflected by the all-reflective mirror 22A with respect to the high-functional dichroic mirror 22.

As described above, the separation wavelength of the high-functional dichroic mirror 22 is set to include the long wavelength side of the excitation wavelength of the first fluorescent dye (405 nm) and the long wavelength side of the excitation wavelength of the second fluorescent dye (488 nm) (details will be described later). Accordingly, a lot of the fluorescence incident on the high-functional dichroic mirror 22 transmit through the high-functional dichroic mirror 22 and direct to the light collecting lens 27.

The fluorescence incident on the light collecting lens 27 are collected to a pinhole of the pinhole member 28. In the fluorescence collected to the pinhole, an unnecessary light ray incident on an area out of the pinhole is cut by the pinhole member 28, and a necessary light ray incident on the pinhole passes through the pinhole member 28 and directs to the relay lens 34. The fluorescence incident on the relay lens 34 are incident on the optical fiber 38 and direct to the detecting unit 50.

In the detecting unit 50, the fluorescence emitted from an exit end of the optical fiber 38 are turned into parallel pencil of light by the collimating lens 51 and incident on the dichroic mirror 52. A separation wavelength of the dichroic mirror 52 is set to include a wavelength between the fluorescence wavelength of the first fluorescent dye (430 nm to 470 nm) and the fluorescence wavelength of the second fluorescent dye (510 nm to 610 nm). Accordingly, between the fluorescence incident on the detecting unit 50, the fluorescence generated by the first fluorescent dye (first fluorescence) is reflected by the dichroic mirror 52, and the fluorescence generated by the second fluorescent dye (second fluorescence) is transmitted through the dichroic mirror 52.

The first fluorescence reflected by the dichroic mirror 52 is incident on the photomultiplier tube 57 via the emission filter 53 and the light collecting lens 54, and the second fluorescence transmitted through the dichroic mirror 52 is incident on the photomultiplier tube 58 via the emission filter 56 and the light collecting lens 55. Here, each of the emission filters 53, 56 is an interference filter formed of a dielectric multi-layer, and is a filter that selectively transmits only the fluorescence wavelength and shields lights having the other wavelengths. For this reason, a transmission wavelength band of the emission filter 53 is set to 430 nm to 470 nm, and a transmission wavelength band of the emission filter 56 is set to 510 nm to 610 nm. These filters shield lights having the excitation wavelength of the first fluorescent dye (405 nm) and the excitation wavelength of the second fluorescent dye (488 nm). Accordingly, even if the laser light reflected at the laser spot on the sample S is mixed in the fluorescence and passes through the same path, it is prevented from being incident on the photomultiplier tubes 57, 58 as unnecessary laser light. Each of the photomultiplier tubes 57, 58 is controlled together with the light scanner 23 by the not-shown controlling unit, and generates an electric signal indicating an amount of incident light. Accordingly, the electric signal repeatedly generated by the photomultiplier tube 57 during a period of the aforementioned two-dimensional scanning indicates a fluorescence image formed by the first fluorescence generated from the sample S, and the electric signal repeatedly generated by the photomultiplier tube 58 during the period of the aforementioned two-dimensional scanning indicates a fluorescence image formed by the second fluorescence generated from the sample S. These fluorescence images are taken into a computer via the controlling unit, and are displayed on the displaying device and stored in a storage part (hard disk drive and the like) in the computer.

Figure 2:
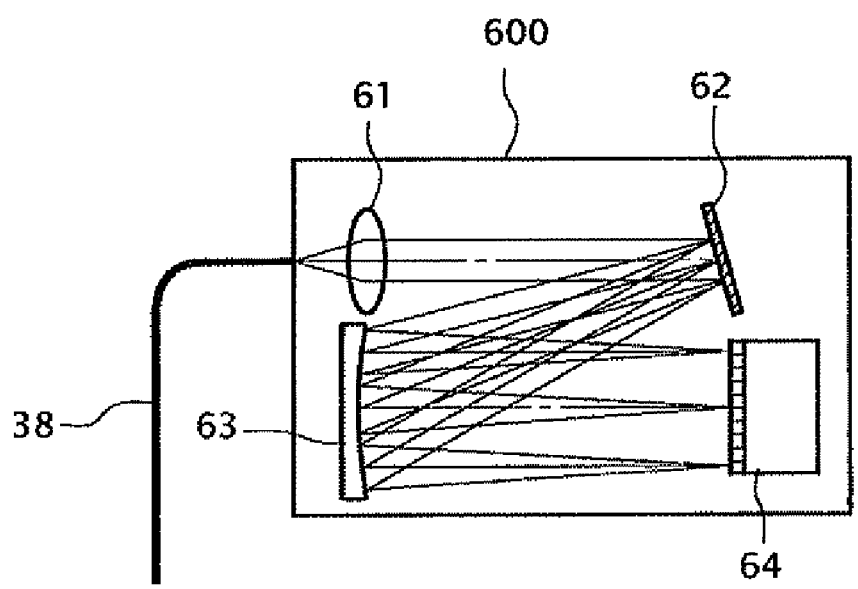
FIG. 2 is a structural diagram of a spectrum detecting unit 600.

Note that in the above-described microscope system, it is also possible to use a spectrum detecting unit 600 shown in FIG. 2 instead of the detecting unit 50. As shown in FIG. 2, the spectrum detecting unit 600 includes a collimating lens 61, a reflection-type grating 62, a light collecting mirror 63, and a multichannel photomultiplier tube 64. The number of light-receiving channels of the photomultiplier tube 64 is, for example, 32.

In the spectrum detecting unit 600, the fluorescence emitted from the exit end of the optical fiber 38 are turned into parallel pencil of light by the collimating lens 61 and incident on the grating 62. The fluorescence incident on the grating 62 are reflected in directions which are deviated little by little for each wavelength. The fluorescence of respective wavelengths are incident on the light collecting mirror 63 and reflected by the light collecting mirror 63. The fluorescence of respective wavelengths reflected by the light collecting mirror 63 are collected on the mutually different light-receiving channels of the photomultiplier tube 64, and converted into electric signals, respectively. Note that although the laser light reflected at the laser spot on the sample S is also mixed in the fluorescence and passes through the same path, since it has a wavelength different from that of the fluorescence, a large part thereof is collected on an outside of the light-receiving channels of the photomultiplier tube 64, and is never converted into the electric signal. The electric signal of each channel repeatedly generated by the photomultiplier tube 64 during the period of the aforementioned second-dimensional scanning indicates a fluorescence spectral image of the sample S. The fluorescence spectral image is taken into a computer via the controlling unit, and is displayed on the displaying device and stored in a storage part (hard disk drive and the like) in the computer.

Note that it is also possible that the computer that takes in the fluorescence spectral image separates (unmixes) the fluorescence image formed by the first fluorescence and the fluorescence image formed by the second fluorescence from the fluorescence spectral image, based on emission spectral data of the first fluorescent dye disclosed by a reagent manufacturer and emission spectral data of the second fluorescent dye disclosed by the reagent manufacturer.

Next, the high-functional dichroic mirror 22 will be described.

As shown in FIG. 1, a posture of the high-functional dichroic mirror 22 is set so that an incident angle $\theta$ of the laser lights and the fluorescence with respect to the high-functional dichroic mirror 22 becomes smaller than 45°. The all-reflective mirror 22A disposed on a previous stage of the high-functional dichroic mirror 22 is a light deflecting mirror disposed to deflect an incident light path of the high-functional dichroic mirror 22.

If the incident angle $\theta$ is made smaller than 45° as described above, the wavelength characteristic of reflection-transmission of the high-functional dichroic mirror 22 becomes unlikely to depend on a polarization direction of the incident light. As a result of this, it becomes easy to reduce the total film-thickness of the dielectric multilayer necessary to obtain a desired wavelength characteristic. Actually, when the incident angle $\theta$ is made smaller than 45°, the total film-thickness of the dielectric multilayer of the high-functional dichroic mirror 22 can be reduced to less than 19.3193 μm.

Further, since the dielectric multilayer becomes thin, a film stress becomes weak and a flatness of the high-functional dichroic mirror 22 is maintained, so that a shape of the laser spot is also preferably maintained, resulting in that a spatial resolution of a fluorescence image is maintained at high level. Further, in accordance with the reduction of the thickness of the dielectric multilayer, the number of layers is decreased, which results in reducing the manufacturing cost of the high-functional dichroic mirror 22.

Incidentally, as the incident angle $\theta$ is smaller, it becomes easier to reduce the thickness of the dielectric multilayer. For instance, if the incident angle $\theta$ is made smaller than 25°, the total film-thickness can be reduced to less than 13.43647 μm, and if the incident angle $\theta$ is made smaller than 15°, the total film-thickness can be reduced to less than 10.27728 μm. Further, if the incident angle $\theta$ is made to be 12°, the total film-thickness can be reduced to as small as 9.42428 μm.

However, it is preferable that the incident angle $\theta$ is not too small, and is 10° at minimum. This is because, if the incident angle $\theta$ is equal to or less than 10°, it becomes necessary to secure a large distance from the high-functional dichroic mirror 22 to an optical element in the periphery thereof (the all-reflective mirror 22A or the light scanner 23) to prevent a necessary light ray from being rejected, which results in increasing the size of the confocal unit 100.

Accordingly, in the present embodiment, the incident angle $\theta$ is set to be within a range of $0° < \theta < 45°$, preferably within a range of $10° < \theta < 25°$, and more preferably within a range of $10° < \theta < 15°$ (about 12°, for example).

Further, in the present embodiment, by utilizing that the wavelength characteristic of the high-functional dichroic mirror 22 becomes easy to be controlled, the wavelength characteristic is controlled as follows.

Figure 3:
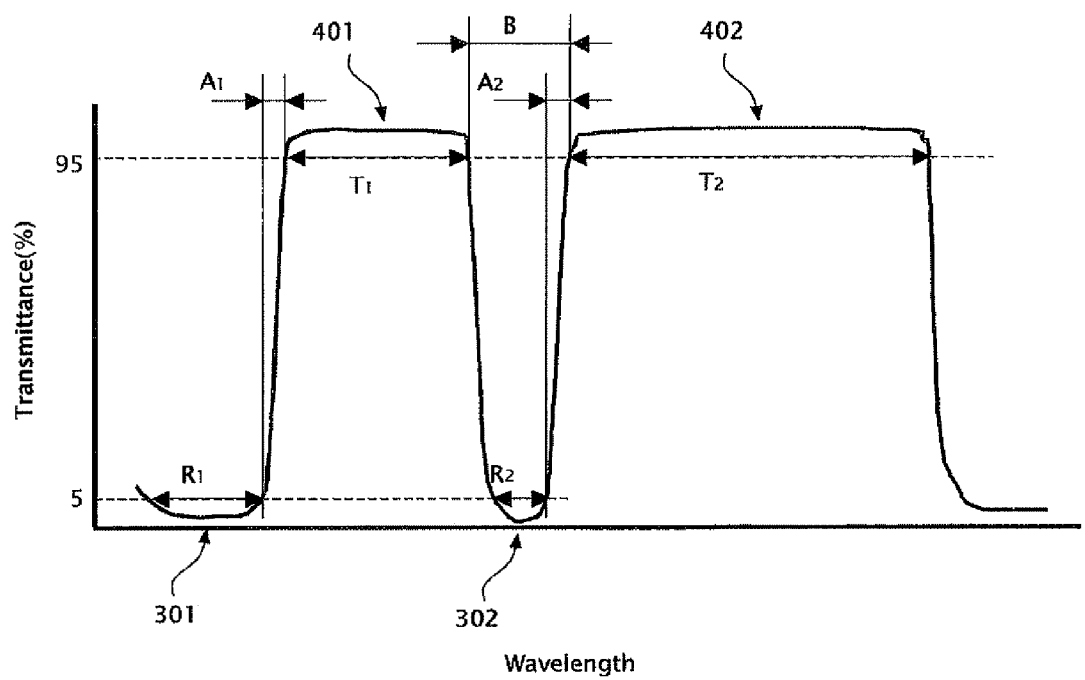
FIG. 3 is a view explaining a wavelength characteristic curve of transmittance of a high-functional dichroic mirror 22.

Next, conditions satisfied by the wavelength characteristic of the high-functional dichroic mirror 22 will be described. FIG. 3 is a view explaining a wavelength characteristic curve of transmittance of the high-functional dichroic mirror 22.

As shown in FIG. 3, in the wavelength characteristic curve of the high-functional dichroic mirror 22, there are arranged a first reflecting band 301, a first transmitting band 401, a second reflecting band 302, and a second transmitting band 402 in this order from a short wavelength side.

Among the above, the first reflecting band 301 covers an excitation wavelength of one fluorescent dye of two types of fluorescent dyes, and the second reflecting band 302 covers an excitation wavelength of the other fluorescent dye.

Further, the first transmitting band 401 covers a fluorescence wavelength of the one fluorescent dye of the two types of fluorescent dyes, and the second transmitting band 402 covers a fluorescence wavelength of the other fluorescent dye.

Accordingly, a boundary wavelength between the first reflecting band 301 and the first transmitting band 401 corresponds to one separation wavelength of the high-functional dichroic mirror 22, and a boundary wavelength between the second reflecting band 302 and the second transmitting band 402 corresponds to the other separation wavelength of the high-functional dichroic mirror 22.

Here, each of a reflectivity in the first reflecting band 301, a reflectivity in the second reflecting band 302, a transmittance in the first transmitting band 401 and a transmittance in the second transmitting band 402 is 95% or more, and each of a wavelength width $T_1$ of the first transmitting band 401 and a wavelength width $T_2$ of the second transmitting band 402 is 25 nm or more.

Accordingly, with the use of the high-functional dichroic mirror 22, it is possible to efficiently introduce each excitation light of the two types of fluorescent dyes into the microscope body 110, and also to efficiently introduce each of the two types of fluorescence generated from the sample S into the detecting unit 50 (or the spectrum detecting unit 600). Therefore, the microscope system of the present embodiment can detect each of the two types of fluorescence images at high sensitivity.

Note that in order to further enhance a detection sensitivity, it is preferable that the reflectivity in the first reflecting band 301 indicates a value of 98% or more along 90% or more of a wavelength width $R_1$ of the band, the reflectivity in the second reflecting band 302 indicates a value of 98% or more along 90% or more of a wavelength width $R_2$ of the band, the transmittance in the first transmitting band 401 indicates a value of 98% or more along 90% or more of the wavelength width $T_1$ of the band, and the transmittance in the second transmitting band 402 indicates a value of 98% or more along 90% or more of the wavelength width $T_2$ or the band.

Further, a rising width $A_1$ from the first reflecting band 301 to the first transmitting band 401 is 6 nm or less, and a rising width $A_2$ from the second reflecting band 302 to the second transmitting band 402 is 6 nm or less. Specifically, a rising edge from the first reflecting band 301 to the first transmitting band 401 and a rising edge from the second reflecting band 302 to the second transmitting band 402 are respectively steep.

Accordingly, even if a Stokes shift of either or both of the two types of fluorescent dyes is tentatively short, there is no chance that the detection sensitivity of the two types of fluorescence images is decreased.

Further, a gap B between the first transmitting band 401 and the second transmitting band 402 is reduced to 20 nm or less. Further, since the transmittance in each of the first transmitting band 401 and the second transmitting band 402 is high to be 95% or more as described above, it can be regarded that no ripple is generated in each of the first transmitting band 401 and the second transmitting band 402.

Accordingly, upon the fluorescence spectral image detected by the spectrum detecting unit 600 (FIG. 2), almost all spectrums of the fluorescence generated from the sample S are reflected. As a result of this, the aforementioned unmix is performed with high accuracy.

Further, since the reflectivity in each of the first reflecting band 301 and the second reflecting band 302 is high to be 95% or more, there is a low possibility that unnecessary laser light is incident on the detecting unit 50 (or the spectrum detecting unit 600).

Therefore, the detecting unit 50 (or the spectrum detecting unit 600) can detect the fluorescence image (or the fluorescence spectral image) with high SN ratio. A high efficiency is achieved particularly in the spectrum detecting unit 600, since the interference filter formed of the dielectric multilayer being the most effective measure as a measure to prevent unnecessary laser light from being incident on the multichannel photomultiplier tube 64 cannot be used in the unit and thus it is difficult to detect the fluorescence spectral image with high SN ratio.

Next, embodiments of the high-functional dichroic mirror 22 will be described.

FIG. 4 and FIG. 5 are views showing a structure of the high-functional dichroic mirror 22 designed under a condition where the incident angle θ is 12°. The structure is such that a dielectric layer made of $Nb_2O_5$ and a dielectric layer made of $SiO_2$ are alternately formed on a quartz glass substrate. Note that FIG. 5 is a continuation of FIG. 4. As shown in FIG. 4 and FIG. 5, under the condition where the incident angle θ is 12°, the total film-thickness of the dielectric multilayer can be reduced to 9.42428 μm.

Figure 6:
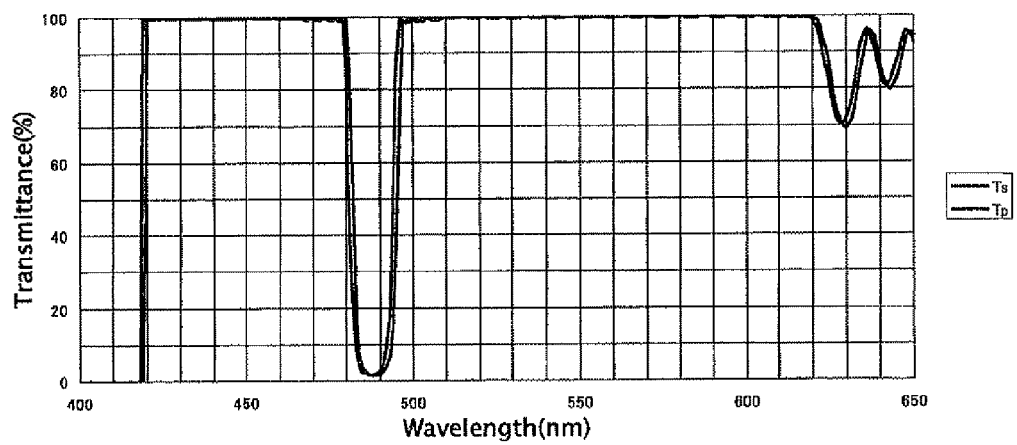
FIG. 6 is a wavelength characteristic curve of the high-functional dichroic mirror designed under a condition where the incident angle θ is 12° (s-polarization components, p-polarization components).
Figure 7:
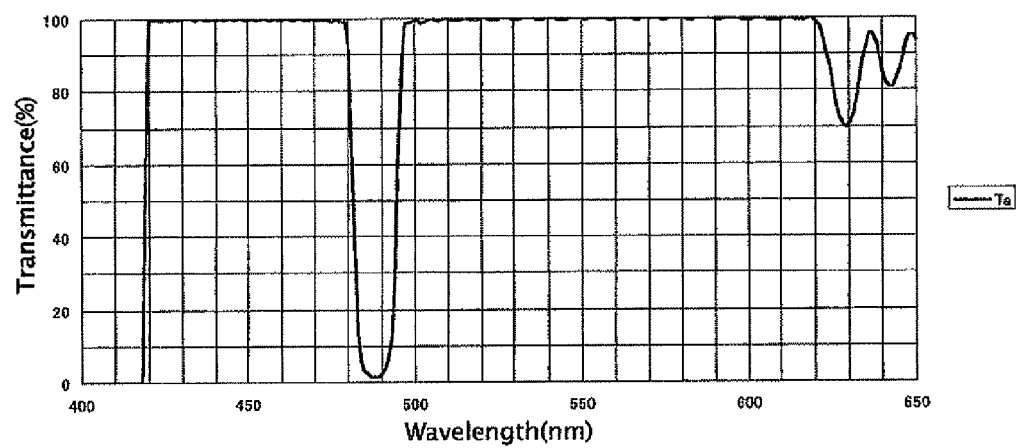
FIG. 7 is a wavelength characteristic curve of the high-functional dichroic mirror designed under a condition where the incident angle θ is 12° (average of s-polarization components and p-polarization components).

FIG. 6 and FIG. 7 are wavelength characteristic curves of the high-functional dichroic mirror 22 designed under a condition where the incident angle θ is 12°. FIG. 6 separately illustrates a characteristic with respect to s-polarization components and a characteristic with respect to p-polarization components, and FIG. 7 illustrates an average of the characteristic with respect to the s-polarization components and the characteristic with respect to the p-polarization components. As shown in FIG. 6, a variation between the characteristic with respect to the p-polarization components and the characteristic with respect to the s-polarization components is small under the condition where θ is 12°, so that a shape of the wavelength characteristic curve is preferable as shown in FIG. 7. Note that "preferable shape" mentioned here refers to a shape with small ripples in which a reflectivity in reflecting bands is high, a transmittance in transmitting bands is high, a rising edge from the reflecting band to the transmitting band is steep, and a gap between each of the transmitting bands is small.

FIG. 8 and FIG. 9 are views showing a structure of the high-functional dichroic mirror 22 designed under a condition where the incident angle θ is 15°. The structure is such that a dielectric layer made of $Nb_2O_5$ and a dielectric layer made of $SiO_2$ are alternately formed on a quartz glass substrate. Note that FIG. 9 is a continuation of FIG. 8. As shown in FIG. 8 and FIG. 9, under the condition where the incident angle θ is 15°, the total film-thickness of the dielectric multilayer can be reduced to 10.27728 μm.

Figure 10:
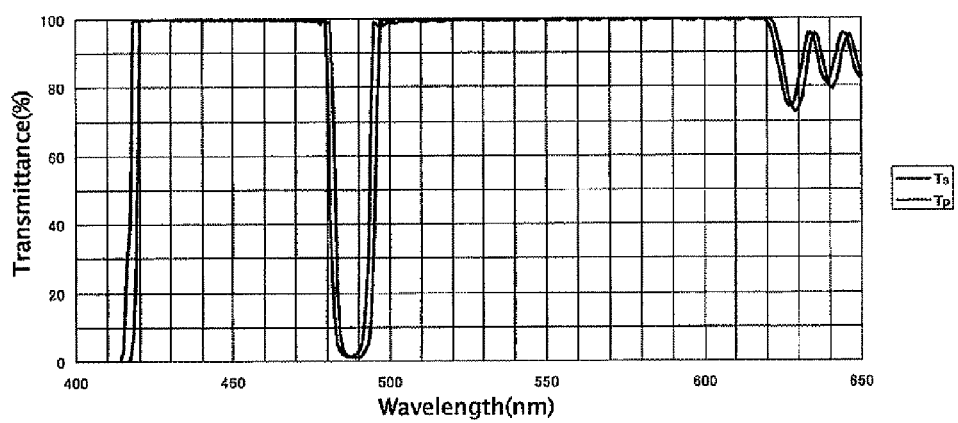
FIG. 10 is a wavelength characteristic curve of the high-functional dichroic mirror 22 designed under a condition where the incident angle θ is 15° (s-polarization components, p-polarization components).
Figure 11:
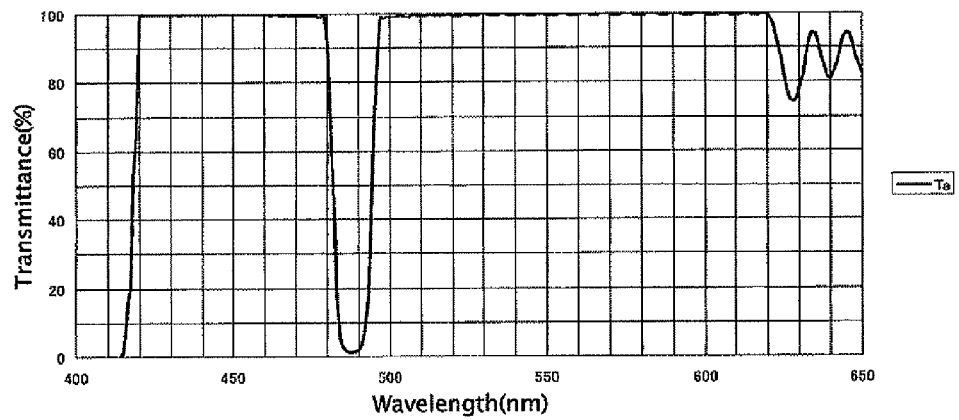
FIG. 11 is a wavelength characteristic curve of the high-functional dichroic mirror 22 designed under a condition where the incident angle θ is 15° (average of s-polarization components and p-polarization components).

FIG. 10 and FIG. 11 are wavelength characteristic curves of the high-functional dichroic mirror 22 designed under a condition where the incident angle θ is 15°. FIG. 10 separately illustrates a characteristic with respect to s-polarization components and a characteristic with respect to p-polarization components, and FIG. 11 illustrates an average of the characteristic with respect to the s-polarization components and the characteristic with respect to the p-polarization components. As shown in FIG. 10, a variation between the characteristic with respect to the p-polarization components and the characteristic with respect to the s-polarization components is small under the condition where θ is 15°, so that a shape of the wavelength characteristic curve is preferable, although not so much preferable as in the case where θ is 12°, as shown in FIG. 11.

FIG. 12 and FIG. 13 are views showing a structure of the high-functional dichroic mirror 22 designed under a condition where the incident angle θ is 25°. The structure is such that a dielectric layer made of $Nb_2O_5$ and a dielectric layer made of $SiO_2$ are alternately formed on a quartz glass substrate. Note that FIG. 13 is a continuation of FIG. 12. As shown in FIG. 12 and FIG. 13, under the condition where the incident angle θ is 25°, the total film-thickness of the dielectric multilayer can be reduced to 13.43647 μm.

Figure 14:
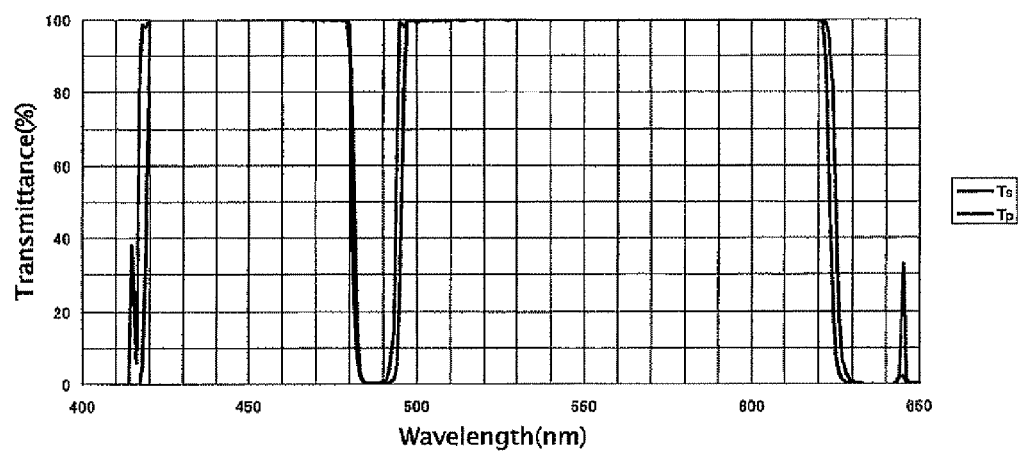
FIG. 14 is a wavelength characteristic curve of the high-functional dichroic mirror 22 designed under a condition where the incident angle θ is 25° (s-polarization components, p-polarization components).
Figure 15:
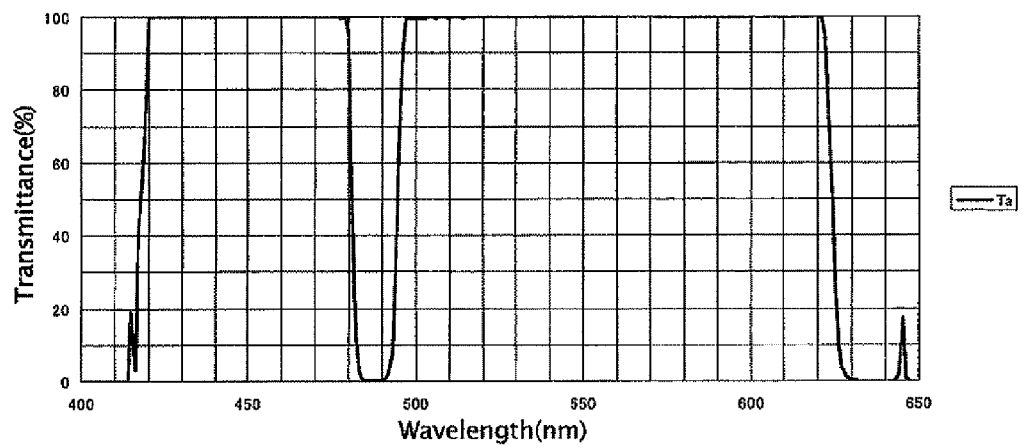
FIG. 15 is a wavelength characteristic curve of the high-functional dichroic mirror 22 designed under a condition where the incident angle θ is 25° (average of s-polarization components and p-polarization components).

FIG. 14 and FIG. 15 are wavelength characteristic curves of the high-functional dichroic mirror 22 designed under a condition where the incident angle θ is 25°. FIG. 14 separately illustrates a characteristic with respect to s-polarization components and a characteristic with respect to p-polarization components, and FIG. 15 illustrates an average of the characteristic with respect to the s-polarization components and the characteristic with respect to the p-polarization components. As shown in FIG. 14, a variation between the characteristic with respect to the p-polarization components and the characteristic with respect to the s-polarization components is small under the condition where θ is 25°, so that a shape of the wavelength characteristic curve is preferable, although not so much preferable as in the case where θ is 15°, as shown in FIG. 15.

FIG. 16 and FIG. 17 are views showing a structure of a high-functional dichroic mirror designed under a condition where the incident angle θ is 45° (comparative example). The structure is such that a dielectric layer made of $Nb_2O_5$ and a dielectric layer made of $SiO_2$ are alternately formed on a quartz glass substrate. Note that FIG. 17 is a continuation of FIG. 16. As shown in FIG. 16 and FIG. 17, under the condition where the incident angle θ is 45°, the total film-thickness of the dielectric multilayer is large and is 19.3193 p.m.

Figure 18:
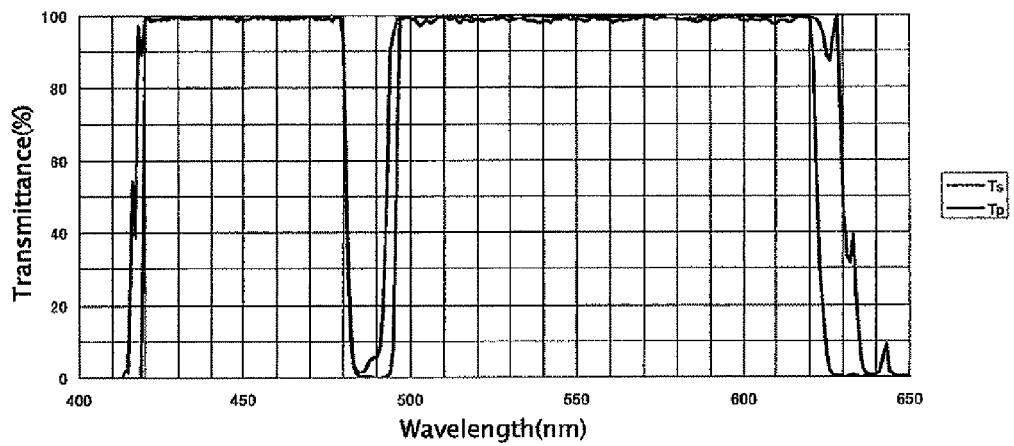
FIG. 18 is a wavelength characteristic curve of a high-functional dichroic mirror designed under a condition where the incident angle θ is 45° (comparative example) (s-polarization components, p-polarization components).
Figure 19:
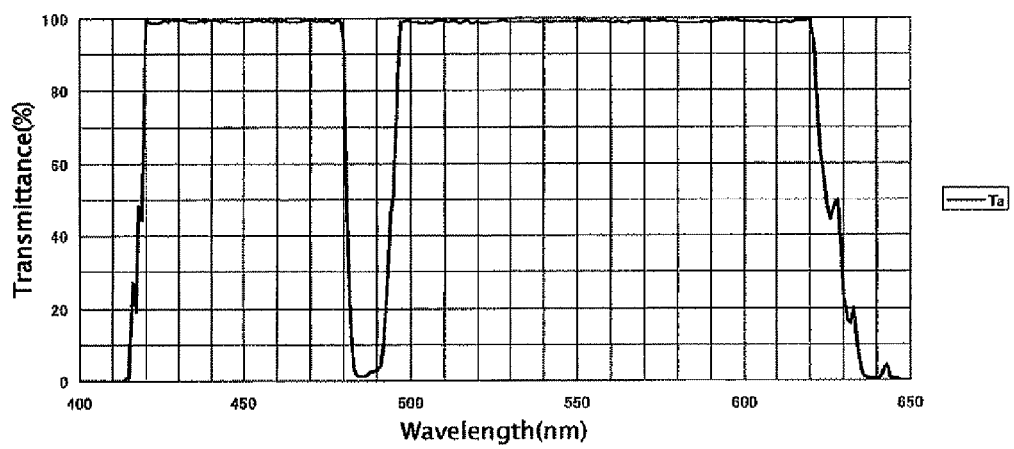
FIG. 19 is a wavelength characteristic curve of the high-functional dichroic mirror designed under a condition where the incident angle θ is 45° (comparative example) (average of s-polarization components and p-polarization components).
Figure 20:
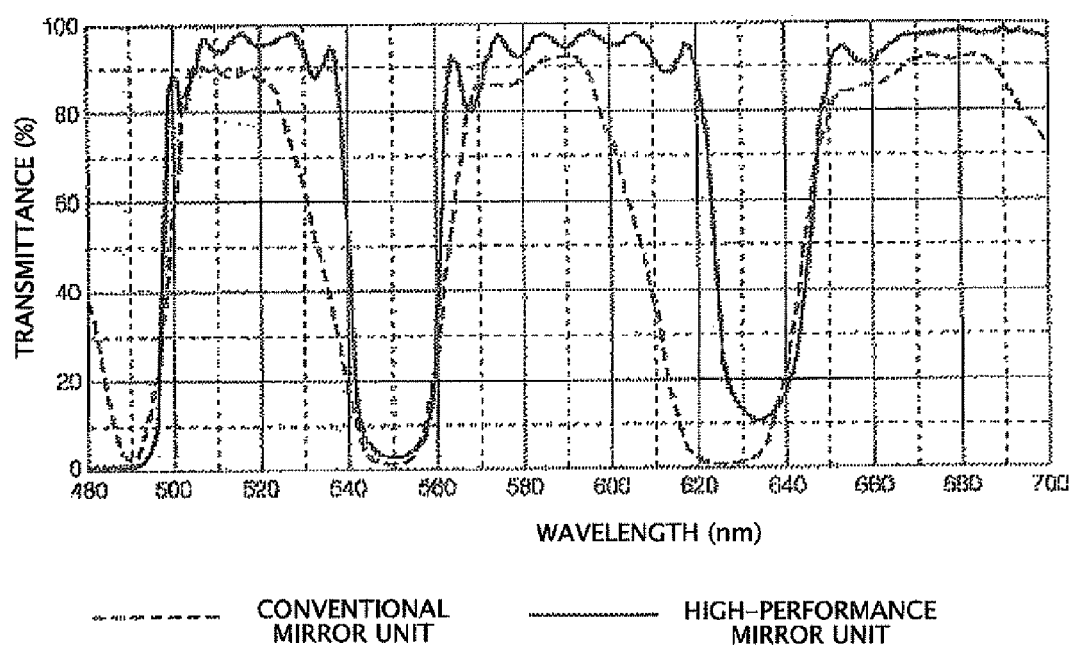
FIG. 20 is a wavelength characteristic curve of transmittance of a high-functional dichroic mirror disclosed in Non-Patent Document 1.

FIG. 18 and FIG. 19 are wavelength characteristic curves of the high-functional dichroic mirror designed under a condition where the incident angle θ is 45° (comparative example). FIG. 18 separately illustrates a characteristic with respect to s-polarization components and a characteristic with respect to p-polarization components, and FIG. 19 illustrates an average of the characteristic with respect to the s-polarization components and the characteristic with respect to the p-polarization components. As shown in FIG. 18, a variation between the characteristic with respect to the p-polarization components and the characteristic with respect to the s-polarization components is large under the condition where θ is 45°, so that a shape of the wavelength characteristic curve is not preferable as shown in FIG. 19.

From the above FIG. 4 to FIG. 19, it is proved that as the incident angle θ is smaller, the dielectric multilayer becomes thinner and the shape of the wavelength characteristic curve becomes more preferable. Accordingly, it is apparent that only by making the incident angle θ with respect to the high-functional dichroic mirror 22 smaller than 45°, both of a prevention of distortion of the high-functional dichroic mirror 22 and a high performance of the high-functional dichroic mirror 22 are simultaneously achieved.

(Other Features)

Note that in the microscope system of the present embodiment, it is preferable that each of the laser unit 10, the high-functional dichroic mirror 22, and the dichroic mirror 52 shown in FIG. 1 is exchangeable, by assuming a possibility of changing a combination of the plurality of types of fluorescent dyes (two types, in this case) with which the sample S is dyed. In such a case, a turret (wheel-shaped switching mechanism) on which a plurality of types of high-functional dichroic mirrors each having a different combination of separation wavelengths are mounted, is mounted on the confocal unit 100, for instance.

Incidentally, it is typical that the switching mechanism is increased in size since a diameter of the wheel is enlarged in accordance the number of dichroic mirrors, but, when the incident angle θ with respect to the dichroic mirror is smaller than 45° as in the microscope system of the present embodiment, it is possible to decrease the size of the dichroic mirrors, and thus the size of the switching mechanism can also be decreased according thereto.

Further, in the present embodiment, there is assumed a case where the number of types of fluorescent dyes with which the sample S is dyed is two, but, the number may also be increased to three or more. In such a case, the number of types of laser lights capable of being emitted by the laser unit 10 is set to three or more, the number of separation wavelengths of the high-functional dichroic mirror 22 is also set to three or more, and the number of fluorescence images capable of being detected by the detecting unit 50 (or the number of fluorescence images capable of being unmixed by the computer) is also set to three or more. Even when the number of types of fluorescent dyes is three or more as described above, only by making the incident angle θ with respect to the high-functional dichroic mirror 22 smaller than 45°, the same effect as that of the aforementioned embodiment can be obtained.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A laser excitation fluorescent microscope, comprising: a light collecting part collecting at least two types of excitation lights radiated by laser light source part on a sample; a dichroic mirror, disposed between the laser light source part and the light collecting part, making the two types of excitation lights incident on the light collecting part by reflecting the two types of excitation lights, and transmitting two types of fluorescence generated at the sample in accordance with the two types of excitation lights; and a detecting part detecting each of the two types of fluorescence transmitted through the dichroic mirror, in which the detecting part includes a plurality of detectors, wherein an incident angle θ of the excitation lights and the fluorescence to the dichroic mirror is smaller than 25°, and a transmittance of each of the two types of fluorescence to the dichroic mirror is 95% or more.

2. The laser excitation fluorescent microscope according to claim 1, wherein
the incident angle θ of the excitation lights and the fluorescence to the dichroic mirror satisfies a formula of 10°<θ<25°.

3. The laser excitation fluorescent microscope according to claim 1, wherein
the incident angle θ of the excitation lights and the fluorescence to the dichroic mirror satisfies a formula of 10°<θ<15°.

4. The laser excitation fluorescent microscope according to claim 1, wherein
the incident angle θ of the excitation lights and the fluorescence to the dichroic mirror is 12°.

5. The laser excitation fluorescent microscope according to claim 1, wherein
a separating layer of the dichroic mirror is formed by a dielectric multilayer.

6. The laser excitation fluorescent microscope according to claim 1, wherein the dichroic mirror includes a separating layer formed by a dielectric multilayer in which a film thickness of each dielectric film forming the dielectric multilayer is set to a non-integral multiple of $\lambda/4$.

7. A laser excitation fluorescent microscope, comprising: a light collecting part collecting at least two types of excitation lights radiated by a laser light source part on a sample; a dichroic mirror, disposed between the laser light source part and the light collecting part, making the two types of excitation lights incident on the light collecting part by reflecting the excitation lights, and transmitting two types of fluorescence generated at the sample in accordance with the two types of excitation lights, the dichroic mirror being formed by a dielectric multilayer; and a detecting part detecting each of the two types of fluorescence transmitted through the dichroic mirror, in which the detecting part includes a plurality of detectors, wherein a wavelength characteristic curve of a reflectivity and a transmittance of the dichroic mirror has: a first reflecting band covering a wavelength band of one of the two types of excitation lights; a first transmitting band covering a wavelength band of one of the fluorescence generated in accordance with said one of the two types of excitation lights; a second reflecting band covering a wavelength band of other one of the two types of excitation lights; and a second transmitting band covering a wavelength band of one of the fluorescence generated in accordance with said other one of the two types of excitation lights, wherein: a reflectivity in each of the first reflecting band and the second reflecting band is 95% or more; a transmittance in each of the first transmitting band and the second transmitting band is 95% or more; a wavelength width $T_1$ of the first transmitting band and a wavelength width $T_2$ of the second transmitting band are each 25 nm or more; and a rising width $A_1$ from the first reflecting band to the first transmitting band and a rising width $A_2$ from the second reflecting band to the second transmitting band are each 6 nm or less.

8. The laser excitation fluorescent microscope according to claim 7, wherein
the transmittance in each of the first transmitting band and the second transmitting band indicates a value of 98% or more for a range of 90% or more of the wavelength width.

9. The laser excitation fluorescent microscope according to claim 7, wherein
a gap B between the first transmitting band and the second transmitting band is 20 nm or less.

10. The laser excitation fluorescent microscope according to claim 7, wherein
an incident angle θ of the excitation lights and the fluorescence to the dichroic mirror satisfies a formula of $0°<θ<45°$.

11. The laser excitation fluorescent microscope according to claim 7, wherein
the incident angle θ of the excitation lights and the fluorescence to the dichroic mirror satisfies a formula of $10°<θ<25°$.

12. The laser excitation fluorescent microscope according to claim 7, wherein
the incident angle θ of the excitation lights and the fluorescence to the dichroic mirror satisfies a formula of $10°<θ<15°$.

13. The laser excitation fluorescent microscope according to claim 7, wherein
the incident angle θ of the excitation lights and the fluorescence to the dichroic mirror is 12°.

14. The laser excitation fluorescent microscope according to claim 7, wherein
the detecting part detects a spectrum of light transmitted through the dichroic mirror.

* * * * *